US010936860B2

(12) United States Patent
Kawashima et al.

(10) Patent No.: US 10,936,860 B2
(45) Date of Patent: Mar. 2, 2021

(54) MARKING ASSIST DEVICE, AND MARKING ASSIST METHOD

(71) Applicant: FUJITSU LIMITED, Kawasaki (JP)

(72) Inventors: Kazuya Kawashima, Fukuoka (JP); Kazumi Kubota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 86 days.

(21) Appl. No.: 16/365,185

(22) Filed: Mar. 26, 2019

(65) Prior Publication Data
US 2019/0220658 A1  Jul. 18, 2019

Related U.S. Application Data

(63) Continuation of application No. PCT/JP2016/080154, filed on Oct. 11, 2016.

(51) Int. Cl.
*G06K 9/00* (2006.01)
*G07C 1/22* (2006.01)
(Continued)

(52) U.S. Cl.
CPC .......... *G06K 9/00342* (2013.01); *A63B 71/06* (2013.01); *G06K 9/00369* (2013.01);
(Continued)

(58) Field of Classification Search
CPC ..... G06K 9/00342; G06K 2009/00738; G06K 9/00711; G06K 9/00724; G06K 9/00765;
(Continued)

(56) References Cited

U.S. PATENT DOCUMENTS 8,321,786 B2 * 11/2012 Lunati .................. G06F 40/232
715/257
2009/0017919 A1 * 1/2009 Brennan ............ A63B 71/0605
463/47
(Continued)

FOREIGN PATENT DOCUMENTS

JP          01-20590        1/1989
JP          2002-251127     9/2002
(Continued)

OTHER PUBLICATIONS

International Search Report attached with the Written Opinion of the International Searching Authority, dated in connection with PCT/JP2016/080154 and dated Dec. 27, 2016, with partial English translation (10 pages).
(Continued)

*Primary Examiner* — Li Liu
(74) *Attorney, Agent, or Firm* — Fujitsu Patent Center

(57) ABSTRACT

A marking assist device includes a memory, a storage that stores an image that records a competition in which a player performs a plurality of skills in a time sequence, and a processor coupled to the memory and configured to acquire a first marking result and a second marking result, the first marking result being marking of each of the plurality of skills based on sensor data on the performing player, the second marking result being inputted by a referee, display first discriminators of the skills included in the first marking result and second discriminators of the skills included in the second marking result while associating the first discriminator with the second discriminator, and when any discriminator is selected from the displayed discriminators, identify a video associated with selected discriminator from the images and displays the identified video.

18 Claims, 21 Drawing Sheets

(51) Int. Cl.
   *G06T 7/292*   (2017.01)
   *A63B 71/06*   (2006.01)

(52) U.S. Cl.
   CPC .......... *G06K 9/00724* (2013.01); *G06T 7/292*
   (2017.01); *G07C 1/22* (2013.01); *A63B*
   *2071/0641* (2013.01); *G06T 2207/30204*
   (2013.01)

(58) Field of Classification Search
   CPC ...... G09B 19/0038; G06T 2207/30221; G06T
   7/20; A61B 5/1128; A63B 24/0003; A63B
   71/06; A63B 24/0006; A63B 24/0062
   See application file for complete search history.

(56) References Cited

U.S. PATENT DOCUMENTS

| | | | | |
|---|---|---|---|---|
| 2009/0210078 A1* | 8/2009 | Crowley | ................ | G16H 10/60 |
| | | | | 700/91 |
| 2009/0220124 A1 | 9/2009 | Siegel | | |
| 2013/0223707 A1 | 8/2013 | Stephenson | | |
| 2014/0257744 A1* | 9/2014 | Lokshin | ............. | A63B 24/0006 |
| | | | | 702/141 |
| 2014/0287388 A1 | 9/2014 | Ferrler | | |
| 2015/0227652 A1 | 8/2015 | Aonuma | | |
| 2016/0217325 A1* | 7/2016 | Bose | ...................... | G11B 27/17 |
| 2019/0220657 A1* | 7/2019 | Yabuki | ............... | A63B 24/0062 |

FOREIGN PATENT DOCUMENTS

| | | |
|---|---|---|
| JP | 2004-208995 | 7/2004 |
| JP | 2015-146980 | 8/2015 |
| WO | 2016/092933 | 6/2016 |

OTHER PUBLICATIONS

EESR—Extended European Search Report of European Patent Application No. 16918513.9 dated Jul. 8, 2019.

EPOA—Official Communication of European Patent Application No. 16918513.9 dated Dec. 3, 2020. ** All references listed in the Office Action were previously cited in the IDS filed on Oct. 3, 2019.

* cited by examiner

FIG. 9

| SKILL NAME TABLE | 111 |
|---|---|
| SKILL NAME | STENOGRAPHIC CHARACTER |
| SKILL W1 | SLL |
| SKILL W2 | mL |
| SKILL W3 | aLL |
| ... | ... |

FIG. 10

| SKILL MANAGEMENT TABLE | | | 112 |
|---|---|---|---|
| SKILL NAME | GROUP | DIFFICULTY | |
| SKILL W1 | I | A | |
| SKILL W2 | III | E | |
| SKILL W3 | IV | E | |
| ... | ... | ... | |

FIG. 11

| DIFFICULTY MANAGEMENT TABLE | 113 |
|---|---|
| DIFFICULTY | VALUE POINT |
| A | 0.1 |
| B | 0.2 |
| C | 0.3 |
| D | 0.4 |
| E | 0.5 |
| F | 0.6 |
| G | 0.7 |

FIG. 12

| SENSING RESULT TABLE | |
|---|---|
| SKILL NAME | CLOCK TIME |
| SKILL W1 | 11:30:30,3 |
| SKILL W2 | 11:30:32,5 |
| SKILL W3 | 11:30:33,6 |
| ... | ... |

| HANDWRITING RECOGNITION RESULT TABLE | 115 |
|---|---|
| SKILL NAME | CLOCK TIME |
| SKILL W1 | 11:30:30,5 |
| SKILL W4 | 11:30:32,2 |
| SKILL W3 | 11:30:33,1 |
| ... | ... |

FIG. 14

SKILL JUDGMENT RESULT SCREEN

AUTOMATIC MARKING RESULT

| TIMELINE | 5:23→6:63 | 9:26→10:16 | 10:16→15:16 | 16:46→17:13 | 19:93→21:30 | 21:30→22:03 | 22:03→26:26 | 26:26→28:66 | 28:66→30:63 | 31:93→34:00 | 34:00→36:13 | 36:13→42:33 |
|---|---|---|---|---|---|---|---|---|---|---|---|---|
| SKILL NAME | BACK SCISSOR TO HANDSTAND | CIRCLE | E FLOPS | D COMBINE | LOOP | CROSS BACK TRAVEL | MAGYAR | SIVADO | DIRECT STOCLI B | WENDE | CROSS BACK TRAVEL | DOWNWARD REVERSE TRAVEL ... |
| DIFFICULTY | D | A | E | D | B | A | D | D | B | B | B | E |
| GROUP | I | II | IV | IV | II | III | III | III | IV | IV | III | V |
| DIFFICULTY VALUE POINT | 0.4 | 0.1 | 0.5 | 0.4 | 0.2 | 0.1 | 0.4 | 0.4 | 0.2 | 0.2 | 0.2 | 0.5 |

HANDWRITING INPUT RESULT

| TIMELINE | 5:23→6:63 | 9:26→10:16 | 10:16→15:16 | 16:46→17:13 | 19:93→21:30 | 21:30→22:03 | 22:03→26:26 | 26:26→28:66 | 28:66→30:63 | 31:93→34:00 | 34:00→36:13 | 36:13→42:33 |
|---|---|---|---|---|---|---|---|---|---|---|---|---|
| SKILL | u.s | *(scribble)* | *(scribble)* | ... | ... | ... | ... | ... | ... | ... | ... | ... |
| SKILL NAME | BACK SCISSOR TO HANDSTAND | LOOP | E FLOPS | D COMBINE | LOOP | CROSS BACK TRAVEL | MAGYAR | SIVADO | DIRECT STOCLI B | WENDE | CROSS BACK TRAVEL | DOWNWARD REVERSE TRAVEL ... |
| DIFFICULTY | D | B | E | D | B | A | D | D | B | B | B | E |
| GROUP | I | II | IV | IV | II | III | III | III | IV | IV | III | V |
| DIFFICULTY VALUE POINT | 0.4 | 0.2 | 0.5 | 0.4 | 0.2 | 0.1 | 0.4 | 0.4 | 0.2 | 0.2 | 0.2 | 0.5 |

[COUNT]

FIG. 15

SKILL JUDGMENT RESULT SCREEN

AUTOMATIC MARKING RESULT

| TIMELINE | 5:23→6:63 | 9:26→10:16 | 10:16→15:16 | 16:46→17:13 | 19:93→21:30 | 21:30→22:03 | 22:0→26:2 | ... | 36:13→42:33 |
|---|---|---|---|---|---|---|---|---|---|
| SKILL NAME | BACK SCISSOR TO HANDSTAND | CIRCLE | E FLOPS | D COMBINE | LOOP | CROSS BACK TRAVEL | MAGY | ... | DOWNWARD REVERSE TRAVEL |
| DIFFICULTY | D | A | E | D | B | A | D | ... | E |
| GROUP | I | II | IV | IV | II | III | III | ... | V |
| DIFFICULTY VALUE POINT | 0.4 | 0.1 | 0.5 | 0.4 | 0.2 | 0.1 | 0.4 | ... | 0.5 |

HANDWRITING INPUT RESULT

| TIMELINE | 5:23→6:63 | 9:26→10:16 | 10:16→15:16 | 16:46→17:13 | 19:93→21:30 | 21:30→22:03 | 22:0→26:2 | ... | 36:13→42:33 |
|---|---|---|---|---|---|---|---|---|---|
| SKILL | (handwritten) | (handwritten) | (handwritten) | | | | | | |
| SKILL NAME | BACK SCISSOR TO HANDSTAND | LOOP | E FLOPS | D COMBINE | LOOP | CROSS BACK TRAVEL | MAGY | ... | DOWNWARD REVERSE TRAVEL |
| DIFFICULTY | D | B | E | D | B | A | D | ... | E |
| GROUP | I | II | IV | IV | II | III | III | ... | V |
| DIFFICULTY VALUE POINT | 0.4 | 0.2 | 0.5 | 0.4 | 0.2 | 0.1 | 0.4 | ... | 0.5 |

[COUNT]

---

SKILL VIDEO PLAYING SCREEN 500

MODIFY MARKING [X]

VIDEO PLAYING — 510

0:00/0:90

SKILL — 520
DIFFICULTY — 530
GROUP — 540

AFTER MODIFICATION IS COMPLETE, COUNT

[DECIDE] — 550

MARKING RESULT DISPLAY SCREEN

| | | | | | |
|---|---|---|---|---|---|
| SKILL | ⤴︎⤴︎⤴︎⌒⤴︎⌒⤴︎⌒ | G | | ×0.7= | |
| | | F | | ×0.6= | |
| | | E | 2 | ×0.5= | 1.0 |
| | | D | 4 | ×0.4= | 1.6 |
| | | C | | ×0.3= | |
| | | B | 4 | ×0.2= | 0.8 |
| | | A | | ×0.1= | |
| DIFFICULTY | DAEDBADDBBBBE | TOTAL ELEMENTS | | | 3.4 |
| | | ELEMENT GROUP | | | 2.0 |
| | | DISMOUNT | | | 0.5 |
| | | CONNECTIONS | | | |
| | 12442333344435 | D SCORE | | | 5.9 |
| GROUP | FINAL SCORE | P | | E SCORE | |
| | NAME | | | | |

SKILL JUDGMENT RESULT SCREEN

AUTOMATIC MARKING RESULT

| TIMELINE | 5:23→6:63 | 9:26→10:16 | 10:16→15:16 | | | | | | | | | |
|---|---|---|---|---|---|---|---|---|---|---|---|---|
| SKILL NAME | BACK SCISSOR TO HANDSTAND | CIRCLE | FLOPS | | | | | | | | | |
| DIFFICULTY | D | A | E | | | | | | | | | |
| GROUP | I | II | IV | | | | | | | | | |
| DIFFICULTY VALUE POINT | 0.4 | 0.1 | 0.5 | | | | | | | | | |

HANDWRITING INPUT RESULT

| TIMELINE | 5:23→6:63 | 9:26→10:16 | 10:16→15:16 | | | | | | | | | |
|---|---|---|---|---|---|---|---|---|---|---|---|---|
| SKILL | (handwritten) | (handwritten) | (handwritten) | | | | | | | | | |
| SKILL NAME | BACK SCISSOR TO HANDSTAND | LOOP | FLOPS | | | | | | | | | |
| DIFFICULTY | D | B | E | | | | | | | | | |
| GROUP | I | II | IV | | | | | | | | | |
| DIFFICULTY VALUE POINT | 0.4 | 0.2 | 0.5 | | | | | | | | | |

[COUNT]

MARKING ASSIST DEVICE, AND MARKING ASSIST METHOD

CROSS-REFERENCE TO RELATED APPLICATION

This application is a continuation application of International Application PCT/JP2016/080154 filed on Oct. 11, 2016 and designated the U.S., the entire contents of which are incorporated herein by reference.

FIELD

The embodiments discussed herein are related to a marking assist device, and a marking assist method.

BACKGROUND

There are some competitions in which referees mark performance of players, and respective ranks of the players are determined based on marked scores. In addition, there are some competitions, such as artistic gymnastics, which include a plurality of skills in one performance. In such competitions, the referees visually check the performances of the players to identify the skills. The referees determine difficulty of the identified skills or a group of the identified skills, or the like, and mark according to the determined difficulty or the group.

Here, utilization of an information processing technology in the marking is under consideration. For example, there is proposed a competition refereeing assist device that receives player data of each player that is transmitted from a communication terminal held by the player and generates refereeing result data representing a refereeing result based on the player data and refereeing data that is stored in advance.

Note that there is also a proposal of assisting markers in a task of marking examination papers. In the proposal, work efficiency of marking is increased by causing a computer to display a marking screen, which is similar to a layout of an examination paper, and allowing the markers to work intuitively on the marking screen, taking advantage of a position, size, and appearance, or the like of answer columns of the exam paper. There is another proposal of a singing ability rating device that marks singing ability by judging at every marking point whether or not a singing signal voltage inputted from a microphone is equal to or larger than a certain voltage.

In marking of competitions, referees may determine a performed skill while watching a performance, quickly and manually write down the skill on paper marking sheets, check what is written down on the marking sheets after the performance, and then calculate scores. This method may lead to a mistake in identifying the skill or counting by the referees.

On the other hand, using a sensing technology and performing the marking by means of an information processor is also under consideration. The information processor marks performances of players who are performing, based on sensor data acquired by sensors. Sensing results by the sensing technology are not necessarily proper data, though.

Thus, it is under consideration to use both of the marking results by the sensing technology and the marking results by the referees, thereby improving reliability of the marking results. For example, any skill whose marking results by the sensing technology and the referees differ may be a candidate for reviewing. Then, a problem is a method of assisting the referees or the like to compare the two marking results.

For example, in order to compare the two marking results, the referees may watch all videos of recorded performances from the beginning for checking. However, the referees are forced to make effort to find out the skill to be reviewed, and it takes time to determine the marking result.

The followings are reference documents.
[Document 1] Japanese Laid-open Patent Publication No. 2004-208995,
[Document 2] Japanese Laid-open Patent Publication No. 2002-251127, and
[Document 3] Japanese Laid-open Patent Publication No. 01-20590.

SUMMARY

According to an aspect of the invention, a marking assist device includes a memory, a storage that stores an image that records a competition in which a player performs a plurality of skills in a time sequence, and a processor coupled to the memory and configured to acquire a first marking result and a second marking result, the first marking result being marking of each of the plurality of skills based on sensor data on the performing player, the second marking result being inputted by a referee, display first discriminators of the skills included in the first marking result and second discriminators of the skills included in the second marking result while associating the first discriminator with the second discriminator, and when any discriminator is selected from the displayed discriminators, identify a video associated with selected discriminator from the images and displays the identified video.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a diagram of an example of a skill name table;

FIG. 10 is a diagram of an example of a skill management table;

FIG. 11 is a diagram of an example of a difficulty management table;

FIG. 12 is a diagram of an example of a sensing result table;

FIG. 13 is a diagram of an example of a handwriting recognition result table;

FIG. 14 is a diagram of a skill judgment result screen;

FIG. 15 is a diagram of an example of a skill video playing screen;

FIG. 16 is a diagram of an example of a marking result display screen;

FIG. 20 is a diagram of other examples of the skill judgment result screen; and

DESCRIPTION OF EMBODIMENTS

In the following, the present embodiment is described with reference to the drawings.

First Embodiment

Figure 1:
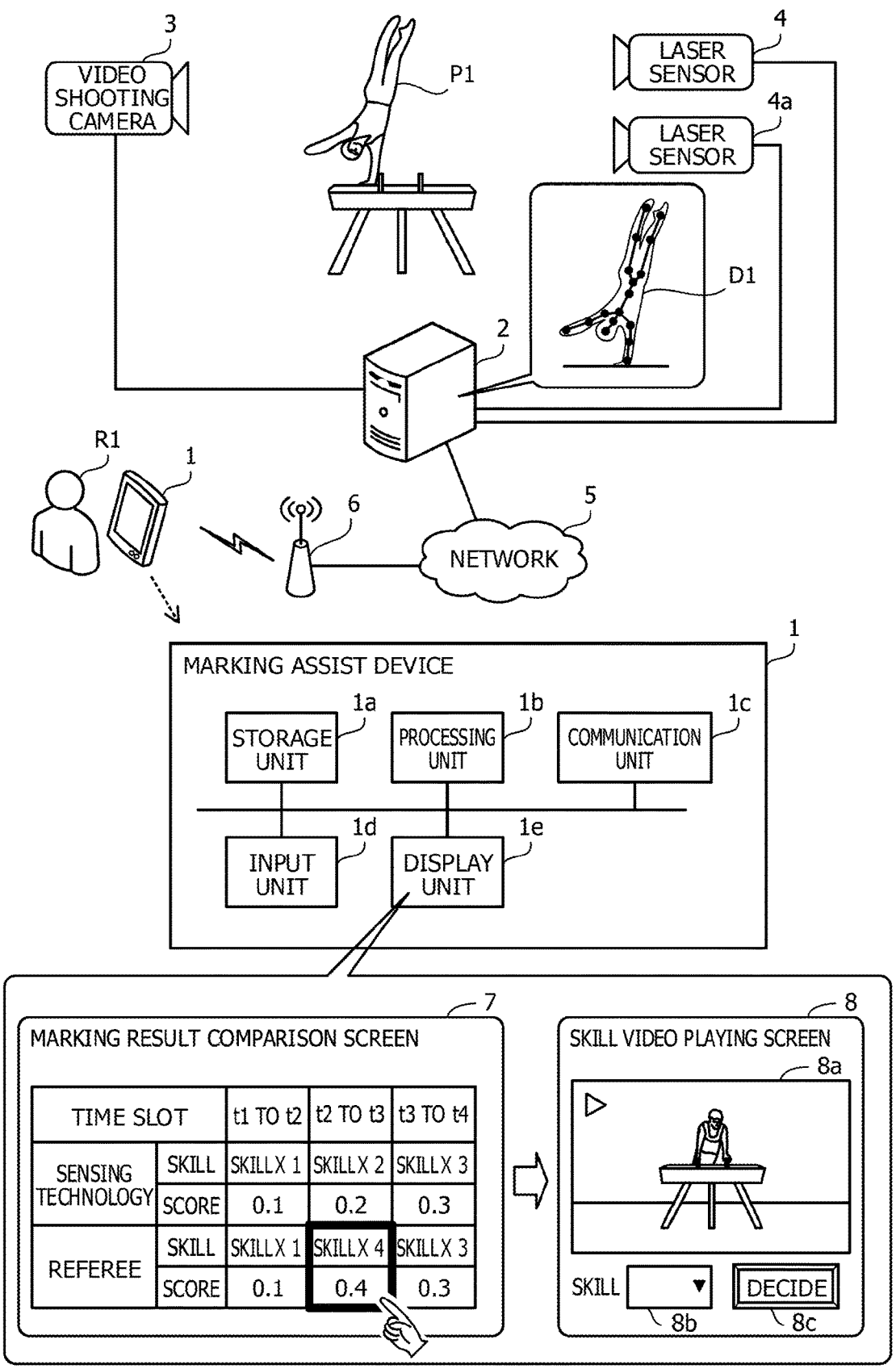
FIG. 1 is a diagram of a marking assist system according to a first embodiment.

FIG. 1 is a diagram of a marking assist system according to a first embodiment. The marking assist system according to the first embodiment assists marking by a referee R1 in a competition. The competition is a competition (artistic gymnastics, for example) in which a player P1 performs a plurality of skills in a time sequence.

The marking assist system according to the first embodiment includes a marking assist device 1, an information processor 2, a video shooting camera 3, and laser sensors 4 and 4a. The information processor 2 is coupled to a network 5. The network 5 is LAN (Local Area Network), for example. The video shooting camera 3 and the laser sensors 4 and 4a are coupled to the information processor 2. An access point 6 is coupled to the network 5. The access point 6 is a relay device that relays communications of the marking assist device 1 and the information processor 2.

Here, the video shooting camera 3 shoots a performance by the player P1 to generate video data and outputs the video data to the information processor 2. The information processor 2 stores the video data received from the video shooting camera 3.

In addition, the laser sensors 4 and 4a are ranging sensors. For example, the laser sensors 4 and 4a irradiate the performing player P1 with laser light, and detect a phase shift of reflected light with respect to reference light to measure a distance. As a frequency of the laser light is selected a frequency that does not disturb the performance of the player P1. The laser sensors 4 and 4a measure the distance with a plurality of points as targets, the plurality of points being on a face perpendicular to a direction from the laser sensors themselves toward the player P1. When the laser light to a certain point hits the player P1, the laser light is reflected by the player P1. When the laser light to another point does not hit the player P1, the laser light is reflected by an object other than the player P1 (wall behind the player P1, for example). In this manner, the laser sensors 4 and 4a acquire information (referred to as sensor data) of a point group that reflects the distance from the laser sensors 4 and 4a to the player P1 or the object around the player P1, and outputs the sensor data to the information processor 2.

The information processor 2 generates skeleton data D1 of the player P1 based on the sensor data. The skeleton data D1 is information representing skeleton of the player P1 and includes, for example, information such as a joint position or a bend angle of a joint, or the like. The information processor 2 obtains the three-dimensional skeleton data D1 by using the sensor data outputted by two or more laser sensors. In addition, the information processor 2 obtains a time sequence change in the skeleton data D1 based on the sensor data outputted to the time sequence by each of the laser sensors. The information processor 2 identifies the skill by the player P1 by matching the time sequence change in the skeleton data D1 against motion pattern information for each of skills stored in the information processor 2.

For example, the motion pattern information is information representing a correspondence between a skill motion pattern (dictionary information in which a change in the skeleton data is patterned for each of the skills) and a skill discriminator. The motion pattern information may include (1) information representing motion patterns of basic motions and (2) information representing the correspondence between a set of the basic motions and the skill discriminator. This is because, for example, there are some competitions, such as the artistic gymnastics, in which the skill is determined based on a combination of the basic motions.

The information processor 2 performs the marking on the identified skill. For example, the information processor 2 performs the marking of the identified skill by identifying difficulty of the identified skill or a group to which the skill belongs based on the information registered in the information processor 2 in advance.

The marking assist device 1 is used by the referee R1 to input a marking result or make a comparison of the marking result. The marking assist device 1 includes a storage unit 1a, a processing unit 1b, a communication unit 1c, an input unit 1d, and a display unit 1e.

The storage unit 1a may be a volatile storage device such as a RAM (Random Access Memory) or a nonvolatile storage device such as a flash memory. The processing unit 1b may include a CPU (Central Processing Unit), a DSP (Digital Signal Processor), an ASIC (Application Specific Integrated Circuit), a FPGA (Field Programmable Gate Array), or the like. The processing unit 1b may also be a processor that executes a program. The processor may be a set of processors (multiprocessor).

The communication unit 1c is a wireless communication interface used for communications with the information processor 2 by way of the access point 6. However, the communication unit 1c may be a wired communication interface to connect to the network 5 by wire. The input unit 1d receives an input by the referee R1. The input unit 1d may also be a pointing device such as a touch panel or a touch pad. The display unit 1e displays a GUI (Graphical User Interface). A liquid crystal display or an organic EL (Electro Luminescence) display may be used as the display unit 1e.

The storage unit 1a stores images that record the competition. The images stored by the storage unit 1a include images of the performance by the player P1. The images may be video data (or a part of the video data) of the video shooting camera 3 delivered by the information processor 2.

The processing unit 1b acquires from the information processor 2 a first marking result that is the marking of each of a plurality of the skills based on the sensor data related to the performing player P1. The processing unit 1b acquires a second marking result inputted by the referee R1. The second marking result is the results of the marking by the referee R1 of each of the plurality of skills.

For example, the processing unit 1b recognizes a character representing the skill inputted to the input unit 1d by the referee R1, thereby receiving the input of the second marking result by the referee R1. The referee R1 inputs the character while watching the performance of the player P1. If the skill is identified by a pair of characters representing the basic motion, the processing unit 1b may identify a break of every skill (that is, a pair of the basic motions, for example) according to a time interval or spacing between the inputted characters. The processing unit 1b may detect input start clock time or input end clock time of the character or the pair of characters to the input unit 1d. The character or the pair of characters is herein referred to as a character string.

Here, the first marking result may include information on the skill recognized by the information processor 2 and the start clock time or the end clock time of the skill. The second marking results may include information on the skill inputted by the referee R1 and the input start clock time or the input end clock time of the skill.

The processing unit 1b displays the first discriminators of the skills included in the first marking result and the second discriminators of the skills included in the second marking result while associating the first discriminators with the second discriminators. The processing unit 1b uses the display unit 1e to display the first marking result and the second marking result (it may also be said that "The processing unit 1b causes the display unit 1e to display the first marking result and the second marking result.").

For example, the processing unit 1b associates the first discriminator of each of the skills included in the first marking result with the second discriminator of the corresponding one of the skills included in the second marking result in sequence with the time sequence of the skill and displays the first discriminators and the second discriminators. Specifically, the processing unit 1b associates the first discriminator with the second discriminator, based on first time at which the player P1 performs an action based on which the first discriminator is determined, and second time at which the referee R1 performs the input associated with the second discriminator. That is, the processing unit 1b identifies the time sequence of the plurality of skills included in the first marking result from the start clock time (or end clock time) of each of the skills, and identifies the time sequence of the plurality of skills included in the second marking result from the input start clock time (or input end clock time) of each of the skills. Then, the processing unit 1b associates, in a one-to-one relation, the discriminators of the plurality of skills included in the first marking result with the discriminators of the plurality of skills included in the second marking result in the order of the two identified time sequences. A marking result comparison screen 7 is a display example by the display unit 1e of a screen generated by the processing unit 1b.

The marking result comparison screen 7 includes entries of a time slot, the sensing technology, and the referee. The time slot entry displays the time slot (clock time may be represented by time elapsed from the start of performance) from start to end of the skill recognized through skill recognition using the sensing technology. In an example of the marking result comparison screen 7 are displayed the three time slots of "t1 to t2", "t2 to t3", and "t3 to t4", as time at which each of the skills is recognized by the sensing technology. The time t1, t2, t3, and t4 represent the time sequence in this order (the time t1 is oldest and the time t4 is newest).

The sensing technology entry displays the discriminator of the skill recognized by the information processor 2 and the score of the skill. In the example of the marking result comparison screen 7, the discriminator of a "Skill X1" and the score of "0.1" are displayed in the time slot "t1 to t2". This indicates that the action by the player P1, which is the source of the judgment on the "Skill X1" by the sensing technology, is performed in the time slot "t1 to t2", and that the score of the "Skill X1" is "0.1". In addition, the discriminator of a "Skill X2" and the score of "0.2" are displayed in the time slot "t2 to t3". Furthermore, the discriminator of a "Skill X3" and the score of "0.3" are displayed in the time slot "t3 to t4".

In the referee entry are displayed the discriminator of the skill corresponding to the character string inputted by the referee R1 and the score of the skill. In the example of the marking result comparison screen 7, the discriminator of the "Skill X1" and the score of "0.1" are displayed in the time slot "t1 to t2". The discriminator of a "Skill X4" and the score of "0.4" are displayed in the time slot "t2 to t3". The discriminator of the "Skill X3" and the score of "0.3" are displayed in the time slot "t3 to t4".

In the example of the marking result comparison screen 7, the first skill is same in the first marking result and the second marking result, being "Skill X1" with the score "0.1". The second skill is the skill "Skill X2" with the score "0.2" in the first marking result and the skill "Skill X4" with the score "0.4" in the second marking result. That is, the second skill differs in both of the marking results. The third skill is same in the first marking result and the second marking result, being the skill "Skill X3" with the score "0.3". In this case, the referee R1 determines that the skill performed in the time slot "t2 to t3" is targeted for reviewing. In addition, the skills performed in the time slot "t1 to t2" and "t3 to t4" have the same results in both of the marking results, and it is likely that both of the marking results is fair. Thus, the referee R1 determines that the skills performed in the time slot "t1 to t2" and "t3 to t4" are not targeted for reviewing (alternatively, the referee R1 lowers priority of reviewing). On the marking result comparison screen 7, the processing unit 1b may highlight parts corresponding to the time slot "t2 to t3" for which the marking results differ (displayed parts of the marking result of the "Skill X4" and "0.4" by the referee R1).

If any discriminator is selected from the displayed discriminators, the processing unit 1b identifies a video associated with the selected discriminator from the images that record the plurality of skills by the player P1 and displays the identified video.

For example, manipulating the input unit id, the referee R1 may select the discriminator of the skill targeted for reviewing (display part corresponding to the marking result "Skill X4" by the referee R1 or the display part corresponding to the marking result "Skill X2" by the sensing technology) displayed on the marking result comparison screen 7. Alternatively, the referee R1 may select the time slot "t2 to t3" as the discriminator of the skill targeted for reviewing. This is because the discriminator such as the "Skill X2" or the "Skill X4" may be associated with the time slot "t2 to t3". Therefore, the time slot "t2 to t3" may also be considered one of the discriminator to be reviewed. If the input unit 1d is a touch panel, the referee R1 may perform the selection by touching the part. Alternatively, if the input unit 1d is a touch pad, the referee R1 may perform the selection by placing on the part a pointer displayed in the marking result comparison screen 7 and performing a predetermined selection operation (such as tapping on the touch pad or pressing a selection button).

Then, the processing unit 1b identifies the video corresponding to the discriminator that is selected using the input unit 1d, from the video data of the performance by the player P1 that is stored in the storage unit 1a (or the information processor 2). For example, if the "Skill X2" or the "Skill X4" is selected, the time slot corresponding to the "Skill X2" or the "Skill X4" is "t2 to t3". Therefore, using the display unit 1e, the processing unit 1b displays a skill video playing screen 8 for playing the skill video of the time slot corresponding to the time slot "t2 to t3" of the video data.

The skill video playing screen 8 includes a video playing area 8a, a skill selection form 8b, and a decide button 8c. The video playing area 8a is an area where the skill video of the corresponding time slot is played. In the foregoing example, the processing unit 1b plays the skill video of the time slot, namely, the time slot of "t2 to t3" and displays the skill video in the video playing area 8a. Note that the processing unit 1b may set time, which is predetermined time earlier than the clock time "t2", for a starting point of a time slot to be played. In addition, the processing unit 1b may set time, which is predetermined time later than the clock time "t3", for an end point of the time slot to be played. The skill selection form 8b is a form for receiving the input of the skill by the referee R1. The decide button 8c is a button for reflecting the skill inputted in the skill selection form 8b on the marking result comparison screen 7.

The referee R1 may confirm the skill video to be played in the video playing area 8a and input the discriminator (skill name, for example) of the skill with the skill selection form 8b. For example, if the referee R1 determines that his or her own determination is wrong, the referee R1 may input the discriminator of the skill that is different from the original skill "Skill X4". For example, the processing unit 1b updates the display of the skill entry of the referee for the time slot "t2 to t3" in the marking result comparison screen 7 (displays the discriminator of a newly inputted skill) with the skill inputted by the referee R1. In addition, the processing unit 1b displays the score corresponding to the difficulty of the skill after being updated, in the entry of the scores by the referee for the time slot "t2 to t3".

The processing unit 1b may calculate the scores of the performance of the player P1 by counting the points displayed in the marking results of the referee R1 on the marking result comparison screen 7 after the update. The processing unit 1b may also display the scores of the performance of the player P1 using the display unit 1e.

Here, it is possible that when the referee R1 compares the marking result by the sensing technology with the marking result of the referee R1, the referee R1 performs checking by watching the entire video of the recorded performance from beginning. However, it is extra work for the referee R1 to check the parts that are same in both of the marking results and troublesome to look for the part for which the judgments on the skill differ, in the video. Consequently, it may take time till the marking result is identified.

Hence, when comparing the first marking result by the sensing technology with the second marking result by the referee R1, the marking assist device 1 displays the discriminators of the skills included in both of the marking results while associating the discriminators with each other. Then, the marking assist device 1 identifies and displays the skill video corresponding to the selected discriminator. This allows the marking assist device 1 to promptly present the information to be used for comparison of the marking results (information included in the marking result comparison screen 7 or the skill video playing screen 8).

With the marking result comparison screen 7, the referee R1 may easily identify the skill that differs in the judgments in both of the marking results. In addition, with the skill video playing screen 8, the referee R1 may quickly check the videos of the part for which the skill judgment results differ and correct the judgment. This may make the marking by the referee R1 efficient. Moreover, the reliability of the marking may be improved efficiently.

In the following, a case is illustratively illustrated in which the marking assist system of the first embodiment is used to mark the artistic gymnastics, and description of functions of the marking assist device 1 is given more specifically.

Second Embodiment

Figure 2:
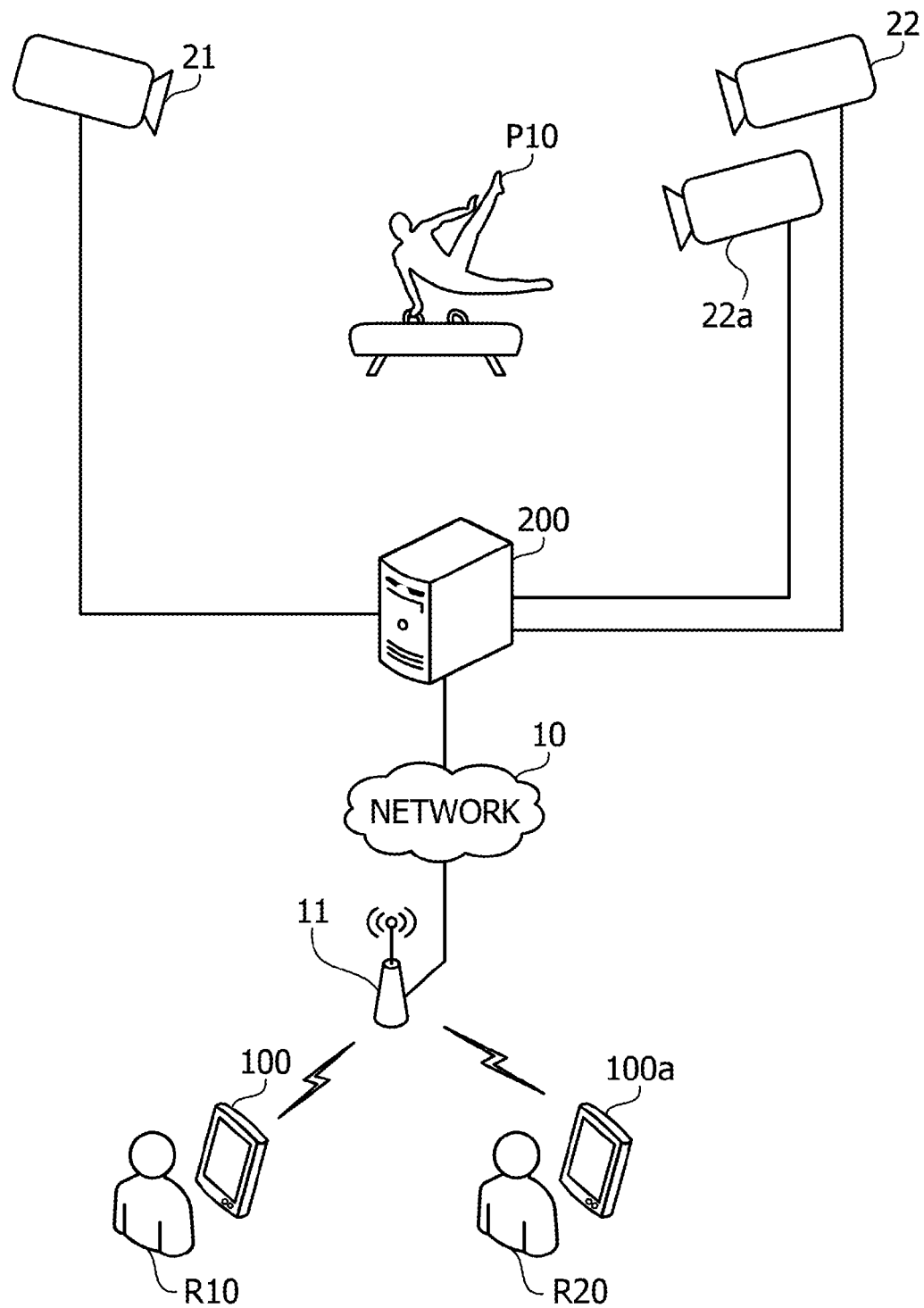
FIG. 2 is a diagram of an example of a marking assist system according to a second embodiment.

FIG. 2 is a diagram of an example of a marking assist system of a second embodiment. The marking assist system of the second embodiment includes terminal devices 100 and 100a, a server 200, a video shooting camera 21, and laser sensors 22 and 22a. The server 200 is coupled to a network 10. The network 10 is a LAN, for example. The video shooting camera 21 and the laser sensors 22 and 22a are coupled to the server 200. An access point 11 is coupled to the network 10. The access point 11 is the relay device that relays communications of the terminal devices 100 and 100a and the server 200.

Here, the video shooting camera 21 shoots performance by a player P10 of the artistic gymnastics to generate the video data and output the data to the server 200.

In addition, the laser sensor 22 and 22a irradiate the performing player P10 with the laser light, and detect the phase shift of the reflected light to the reference light to measure the distance. As the frequency of the laser light is selected the frequency that does not disturb the performance of the player P10. The laser sensors 22 and 22a acquire information (sensor data) of the point group that reflects the distance from the laser sensors 22 and 22a to the player P10 or an object around the player P10, and outputs the sensor data to the server 200.

The terminal device 100 is a client computer used by a referee R10. The terminal device 100a is a client computer used by a referee R20. The terminal devices 100 and 100a may be a tablet-type terminal device or a laptop-type PC (Personal Computer). The terminal devices 100 and 100a communicate with the server 200 by way of the access point 11. The terminal devices 100 and 100a are an example of the marking assist device 1 of the first embodiment.

The server 200 is a server computer that stores the video data generated by the video shooting camera 21. The server 200 also recognizes skills included in the performance of the player P10 based on the sensor data generated by the laser sensors 22 and 22a.

Here, in the artistic gymnastics, ranks of respective players are determined in accordance with the marking of a D score (Difficulty score) and an E score (Execution score) by the referees. The D score is a score that evaluates difficulty of performance in terms of contents. The E score is a score that evaluates beauty of the performance (organization of the performance, a skill, and a posture, or the like).

The D score is marked by a referee (D referee) who marks the D score. The E score is marked by referees (E referee and an R referee) who mark the E score. In the marking assist system of the second embodiment, assistance in marking of the D score is mainly assumed. Thus, the referees R10 and R20 are the referees marking the D score (D referees). The referees who mark the D score work as a team of a plurality of referees (two referees, specifically).

In addition, in the performance, the plurality of skills is performed by the player P10 in the time sequence. The skills are a combination of the plurality of the basic motions. Thus, the server 200 first recognizes the basic motions based on the sensor data. Then, the server 200 recognizes the combination of the basic motions, thereby recognizing the skill corresponding to the combination of the basic motions.

The skills are associated with the difficulty and the group. A value point of the skill is defined by the difficulty. In addition, the score is also given to the group to which the skill done in the performance belongs (request group point). Furthermore, in some competitive sports, the score is also given to the combination of the skills (combination point addition). For example, the combination point addition is applied to such competitions as the floor exercise or the high bar, for example. A total of these scores represents the D score.

The server 200 is an example of the information processor 2 of the first embodiment. Note that a server computer for storing the video data generated by the video shooting camera and a server computer for performing the skill recognition through the sensing technology may be separately installed and coupled to the network 10.

In the following, the men's pommel horse is considered as an example of the artistic gymnastics. However, the marking assist system of the second embodiment may be applied even to different marking rules corresponding to an event, a gender, and a generation.

Figure 3:
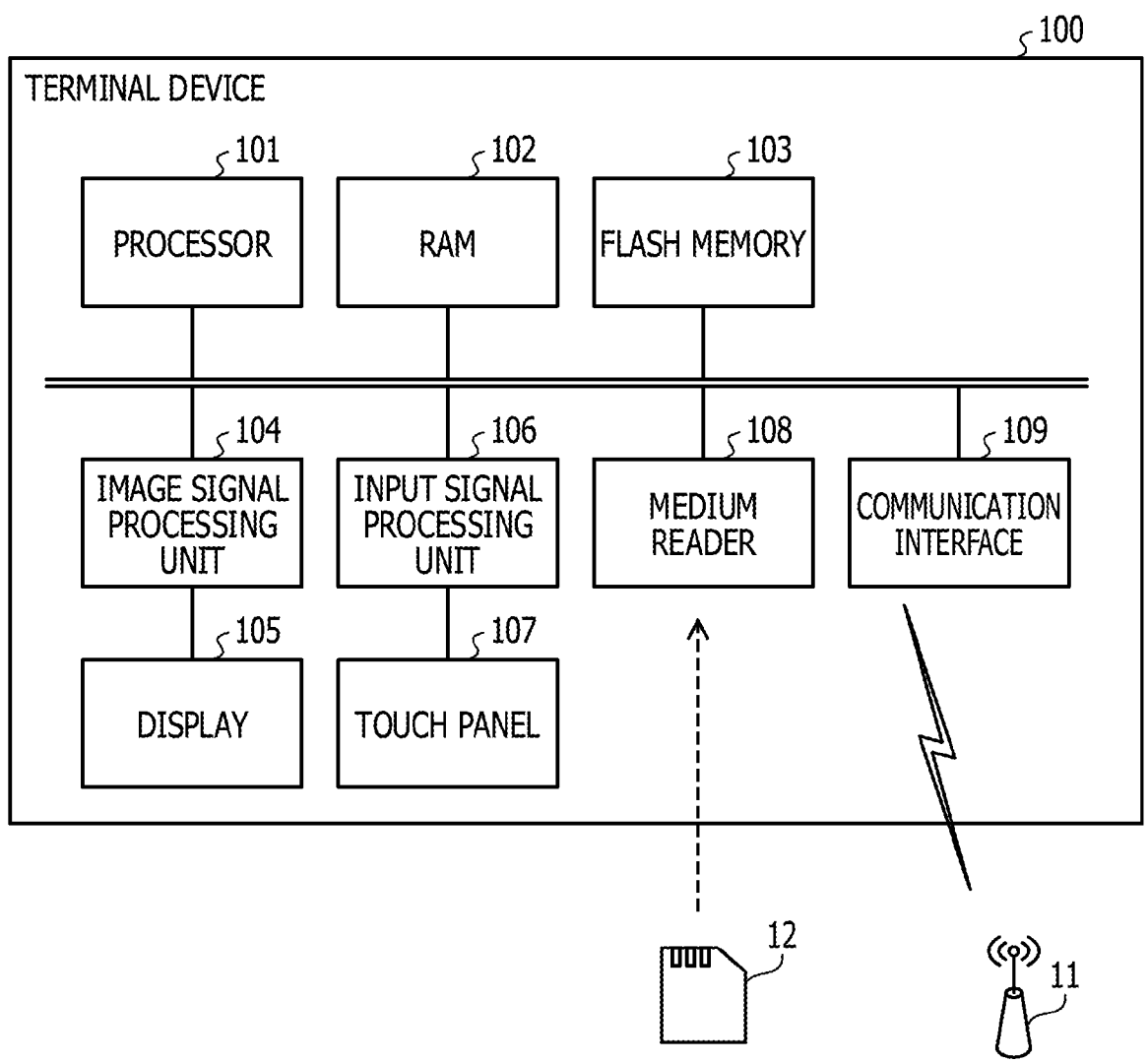
FIG. 3 is a diagram of a hardware example of a terminal device.

FIG. 3 is a diagram of a hardware example of the terminal device. The terminal device 100 includes a processor 101, a RAM 102, a flash memory 103, an image signal processing unit 104, a display 105, an input signal processing unit 106, a touch panel 107, a medium reader 108, and a communication interface 109. Each unit is coupled to a bus of the terminal device 100. The terminal device 100a is also implemented by similar hardware to the terminal device 100.

The processor 101 controls information processing of the terminal device 100. The processor 101 may be the multiprocessor. The processor 101 may be, for example, the CPU, the DSP, the ASIC, or the FPGA, or the like. The processor 101 may be a combination of two or more elements of the CPU, the DSP, the ASIC, the FPGA, or the like.

The RAM 102 is a main storage device of the terminal device 100. The RAM 102 temporarily stores at least a part of an OS (Operating System) program or application programs that the processor 101 is caused to execute. The RAM 102 also stores various types of data used for processing by the processor 101.

The flash memory 103 is an auxiliary storage device of the terminal device 100. The flash memory 103 stores the OS program, the application programs, and the various types of data.

The image signal processing unit 104 outputs images to the display 105 in accordance with an instruction from the processor 101. For example, the liquid crystal display or the organic electro luminescence (EL) display may be used for the display 105.

The input signal processing unit 106 acquires an input signal from the touch panel 107 coupled to the terminal device 100 and outputs the input signal to the processor 101. The touch panel 107 is a pointing device that outputs to the processor 101 a position touched and manipulated by a user. The touch panel 107 is placed in a stacked manner in a display area of the display 105. The user may perform a touch operation with the touch panel 107 while visually recognizing display by the display 105.

The medium reader 108 is a device that reads a program or data recorded in a recording medium 12. For example, a flash memory card may be used as the recording medium 12. The medium reader 108 stores the program or the data read from the recording medium 12 in the RAM 102 or the flash memory 103, in accordance with the instruction from the processor 101.

The communication interface 109 is a wireless communication interface that establishes a wireless link with the access point 11 and communicates with the server 200 by way of the access point 11 and the network 10. However, the communication interface 109 may be the wired communication interface coupled to the network 10 by wire.

Figure 4:
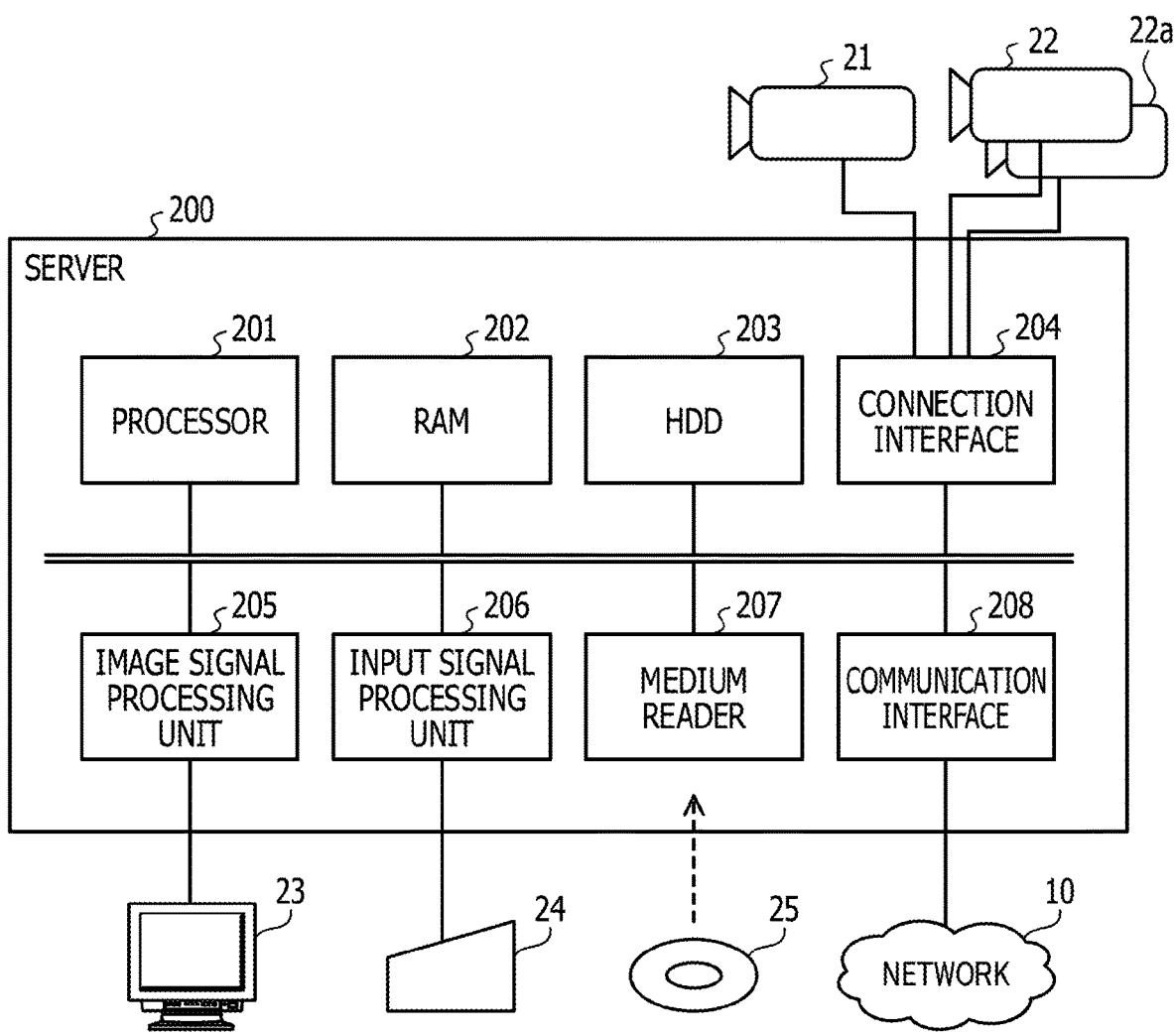
FIG. 4 is a diagram of the hardware example of a server.

FIG. 4 is a diagram of a hardware example of the server. The server 200 includes a processor 201, a RAM 202, a HDD (Hard Disk Drive) 203, a connection interface 204, an image signal processing unit 205, an input signal processing unit 206, a medium reader 207, and a communication interface 208. These units are coupled to a bus of the server 200.

The processor 201 controls the information processing of the server 200. The processor 201 may be the multiprocessor. The processor 201 may be, for example, the CPU, the DSP, the ASIC, or the FPGA, or the like. The processor 201 may be the combination of the two or more elements of the CPU, the DSP, the ASIC, the FPGA, for example.

The RAM 202 is the main storage device of the server 200. The RAM 202 temporarily stores at least the part of the OS program or the application programs that the processor 201 is caused to execute. The RAM 202 also stores the various types of data used for processing by the processor 201.

The HDD 203 is the auxiliary storage device of the server 200. The HDD 203 magnetically performs writing and reading of data on a built-in magnetic disk. The HDD 203 stores the OS program, the application programs, and the various types of data. The server 200 may also include other types of auxiliary storage devices such as the flash memory or an SSD (Solid State Drive), or the like, and may include more than one auxiliary storage device.

The connection interface 204 is an interface used for connection with the video shooting camera 21 and the laser sensors 22 and 22a. However, the video shooting camera 21 and the laser sensors 22 and 22a may be coupled to the network 10. In that case, the server 200 communicates with the video shooting camera 21 and the laser sensors 22 and 22a by way of the communication interface 208 to be described below.

The image signal processing unit 205 outputs images to a display 23 coupled to the server 200, in accordance with an instruction from the processor 201. A CRT (Cathode Ray Tube) display or the liquid crystal display may be used as the display 23.

The input signal processing unit 206 acquires the input signal from an input device 24 coupled to the server 200 and outputs the input signal to the processor 201. For example, the pointing device such as a mouse or the touch panel, a keyboard, or the like may be used as the input device 24.

The medium reader 207 is a device that reads the programs or the data recorded in a recording medium 25. For example, the magnetic disk such as a flexible disk (FD: Flexible Disk) or the HDD, an optical disk such as or a CD (Compact Disc) or DVD (Digital Versatile Disc), a magneto-optical disk (MO: Magneto-Optical disk) may be used as the recording medium 25. In addition, a nonvolatile semiconductor memory such as the flash memory card or the like may also be used as the recording medium 25. The medium reader 207 stores the program or the data read from the recording medium 25 in the RAM 202 or the HDD 203, in accordance with the instruction from the processor 201.

The communication interface 208 communicates with the terminal devices 100 and 100a by way of the network 10. The communication interface 208 may be the wired communication interface or the wireless communication interface.

Figure 5:
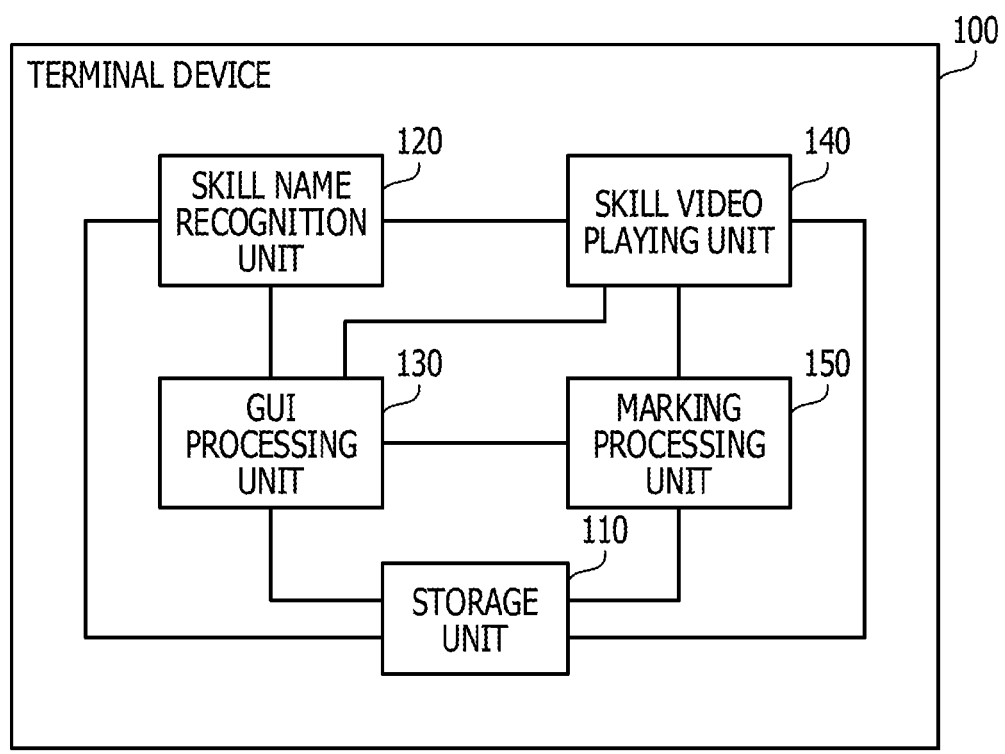
FIG. 5 is a diagram of a functional example of the terminal device.

FIG. 5 is a diagram of a functional example of the terminal device. The terminal device 100 includes a storage unit 110, a technical name recognition unit 120, a GUI processing unit 130, a skill video playing unit 140, and a marking processing unit 150. The storage unit 110 is implemented using a storage area reserved in the RAM 102 or the flash memory 103. The skill name recognition unit 120, the GUI processing unit 130, the skill video playing unit 140, and the marking processing unit 150 are implemented by the processor 101 executing the program stored in the RAM 102.

The storage unit 110 stores information for recognizing characters inputted by the referee R10 to convert the characters into a skill name or information on the group or the difficulty corresponding to the skill name. The storage unit 110 also stores information on the scores corresponding to the difficulty or the request group point, or the like. Furthermore, the storage unit 110 may also store information on contents of the combination point addition (correspondence relation of the combination of the skills and the points to be added, for example).

The skill name recognition unit 120 recognizes the skill name judged by the referee R10 by converting the character string inputted by the referee R10 into the skill name. The skill name recognition unit 120 refers to information for character recognition stored in the storage unit 110 and converts the inputted character string into the skill name.

The GUI processing unit 130 causes the display 105 to display the GUI. For example, the GUI processing unit 130 causes the display 105 to display a screen assisting the referee R10 in handwriting input of the skill. The GUI processing unit 130 also causes the display 105 to display a screen comparing the marking result by the referee R10 and the marking result by the server 200. Furthermore, the GUI processing unit 130 causes the display 105 to display a screen playing the video of the skill selected by the referee R10.

The skill video playing unit 140 plays the skill video. The skill video playing unit 140 acquires the discriminator of the skill selected by the referee R10 from the GUI processing unit 130 and acquires the skill video corresponding to the discriminator from the server 200. The skill video playing unit 140 plays the skill video to display the played skill video on the GUI.

The marking processing unit 150 marks performances. The marking processing unit 150 refers to information (including information on the marking rules) stored in advance in the storage unit 110 to identify the difficulty of the recognized skill name or the group corresponding to the skill name and mark in accordance with the difficulty and the group. The marking processing unit 150 causes the GUI processing unit 130 to display the marking result on the GUI.

The terminal device 100a also has similar functions to the terminal device 100.

Figure 6:
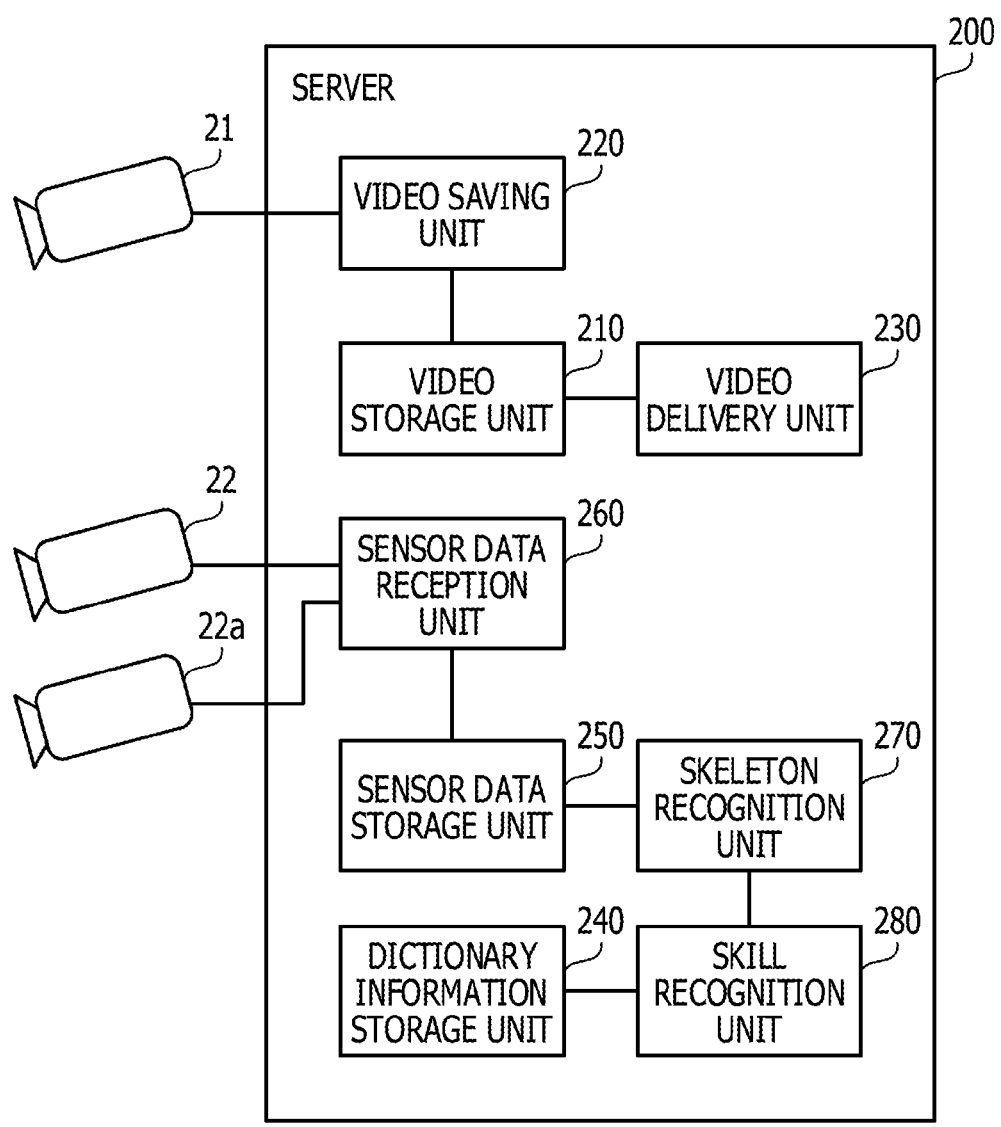
FIG. 6 is a diagram of the functional example of the server.

FIG. 6 is a diagram of a functional example of the server. The server 200 includes a video storage unit 210, a video saving unit 220, a video delivery unit 230, a dictionary information storage unit 240, a sensor data storage unit 250, a sensor data reception unit 260, a skeleton recognition unit 270, and a skill recognition unit 280. The video storage unit 210, the dictionary information storage unit 240, and the sensor data storage unit 250 are implemented by using a storage area reserved in the RAM 202 or the HDD 203. The video saving unit 220, the video delivery unit 230, the sensor data reception unit 260, the skeleton recognition unit 270, and the skill recognition unit 280 are implemented by the processor 201 executing the program stored in the RAM 202.

The video storage unit 210 stores video shot by the video shooting camera 21.

The video saving unit 220 receives the video shot by the video shooting camera 21 and stores the video in the video storage unit 210. The video includes information on shooting start clock time or shooting end clock time. The video also includes information on performance start time when the player P10 starts the performance.

The video delivery unit 230 delivers the video of the specified time slot to the terminal devices 100 and 100a, in response to a request of the terminal devices 100 and 100a. The video delivery unit 230 may real-time deliver the video during performance to any client terminal other than the terminal devices 100 and 100a as viewing for competition audience.

The dictionary information storage unit 240 stores basic motion dictionary information used for recognition of the basic motions. The basic motion dictionary information is information that associates the discriminators of the basic motions with the motion patterns of the skeleton data corresponding to the basic motions. The motion patterns of the skeleton data are generated in advance using a machine learning technology, for example. The dictionary information storage unit 240 stores skill-related dictionary information used for recognition of the skills. The skill-related dictionary information is information that associates the combination of the basic motions with the skill discriminator (skill name).

The sensor data storage unit 250 stores the sensor data generated by the laser sensors 22 and 22a. The sensor data is data that is a source of the skeleton data.

The sensor data reception unit 260 receives the sensor data generated by the laser sensors 22 and 22a and stores the sensor data in the sensor data storage unit 250. The sensor data includes the information on the performance start clock time or information on performance end clock time. The performance start clock time is synchronized with performance start clock time in the video shot by the video shooting camera 21 (in this case, both of the performance start clock time represents same clock time for a certain skill).

The skeleton recognition unit 270 generates the skeleton data by a predetermined calculation based on the sensor data stored in the sensor data storage unit 250. The skeleton data is information representing skeleton of the player P10 and includes information of the joint position or the bend angle of the joint, or the like. The skeleton recognition unit 270 obtains the three-dimensional skeleton data by using the sensor data outputted by the two laser sensors 22 and 22a. The skeleton recognition unit 270 may also generate the three-dimensional skeleton data using the sensor data outputted by three or more laser sensors. The skeleton recognition unit 270 obtains the time sequence change of the skeleton data based on the sensor data outputted to the time sequence by the laser sensors 22 and 22a.

The skill recognition unit 280 identifies the basic motions by the player P10 by matching the time sequence changes of the skeleton data against the information on the motion pattern per basic motion in the basic motion dictionary information stored in the storage unit 110. Then, the skill recognition unit 280 refers to the skill-related dictionary information stored in the storage unit 110 to identify the skill name corresponding to the combination of the basic motions. The skill recognition unit 280 transmits the skill name of the identified skill, the skill start clock time, and the skill end clock time to the terminal devices 100 and 100a.

Figure 7:
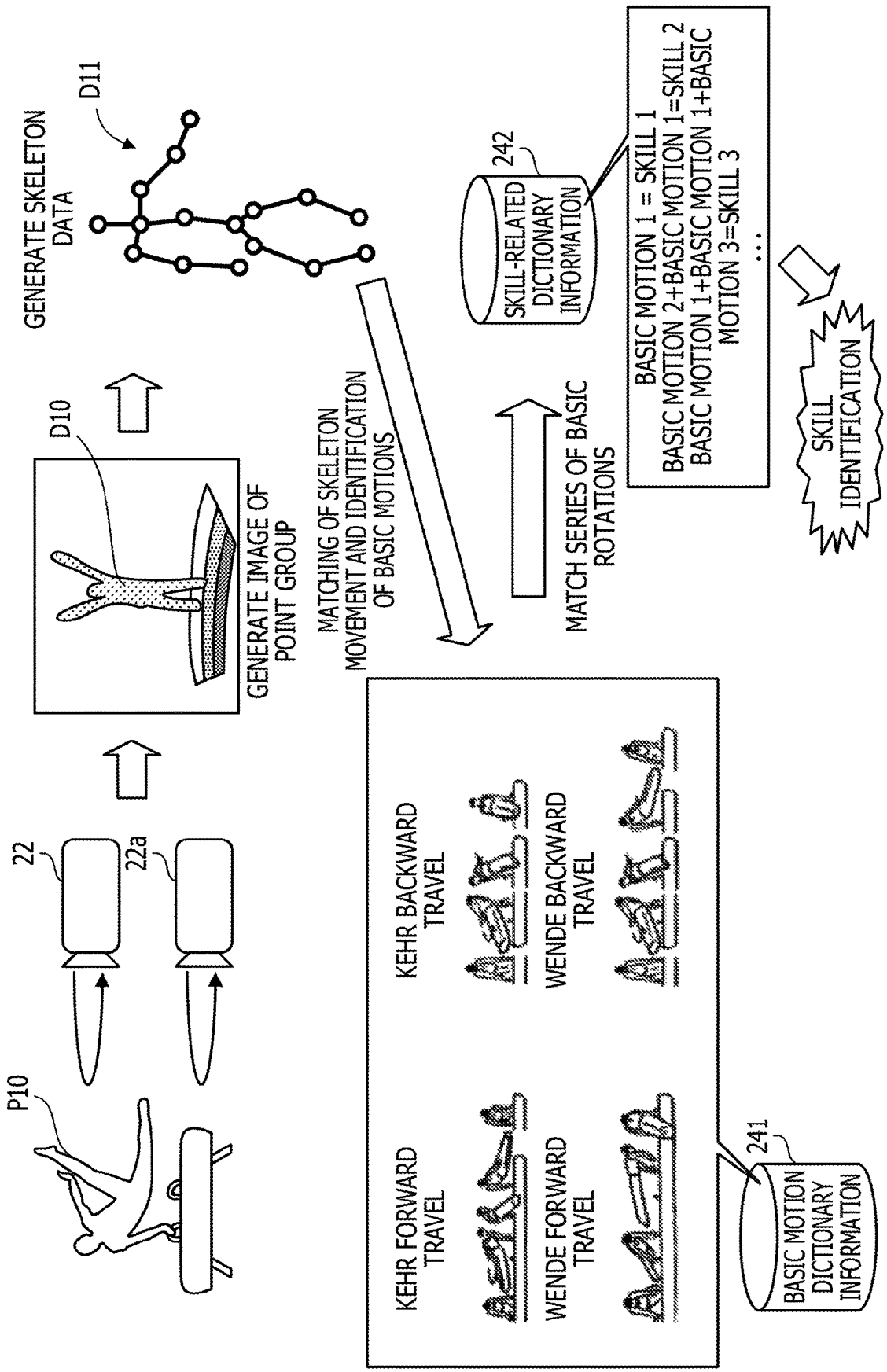
FIG. 7 is a diagram of an example of skill recognition by a 3D sensing technology.

FIG. 7 is an example of a diagram of the skill recognition by a 3D sensing technology. The laser sensor 22 measures the distance with a plurality of points as targets, the plurality of points being on a face (it is assumed that there is a virtual face behind the player P10 (or in front of the player P10)) perpendicular to a direction from the laser sensor 22 toward the player P10. For example, the laser sensor 22 irradiates 320*200 points with laser to measure the distance from the laser sensor 22 to each of the points. If laser light to a certain point hits the player P10, the laser light is reflected by the player P10. If the laser light to another point does not hit the player P10, the laser light is reflected by an object other than the player P10 (wall behind the player P10, for example).

For example, the laser sensor 22 acquires the sensor data at a frequency of 30 times in a second (that is, 30 fps (frames per second)) with information on the distance of 320*200 points as one set (one unit of sensor data). This also applies to the laser sensor 22a.

If it is assumed that the distance information is of 2 bytes, and the two laser sensors 22 and 22a are used, a rate of the sensor data is approximately (320*200) [points]*(2+2) [bytes]*30 [fps] to 58.5 Mbps (Megabits per second). Note that the calculation is performed with 1 k (kilo) as 1024 and 1M (Mega) as 1024 k.

The sensor data reception unit 260 receives the sensor data from the laser sensors 22 and 22a and stores the sensor data in the sensor data storage unit 250.

Based on the sensor data stored in the sensor data storage unit 250, the skeleton recognition unit 270 generates an image of the point group reflecting the distance from a predetermined observation point to each point where the laser light is reflected. For example, since the skeleton recognition unit 270 acquires the sensor data at 30 fps, the skeleton recognition unit 270 acquires the image of the point group of 30 frames per second. The image of the point group includes a point group D10 that forms a three-dimensional contour of the player P10.

The skeleton recognition unit 270 generates skeleton data D11 through the predetermined calculation based on the point group D10. The skeleton recognition unit 270 generates the skeleton data D11 for 30 frames per second at a maximum. The skeleton recognition unit 270 detects the time sequence change of the skeleton data D11 for 30 frames per second at a maximum. Thus, the skeleton recognition unit 270 recognizes movement of the skeleton of the player P10.

The skill recognition unit 280 matches the recognized movement of the skeleton against the motion patterns of the basic motions registered in advance in basic motion dictionary information 241 to identify the basic motions. As described above, the motion patterns registered in the basic motion dictionary information 241 are generated in advance by the machine learning that uses the sensor data for training, for example. For example, examples of the basic motions in the pommel horse include "Kehr forward travel", "Wende forward travel", "Kehr backward travel", and "Wende backward travel".

The skill recognition unit 280 refers to the skill-related dictionary information 242 to identify the skill corresponding to a series of the identified basic motions. For example, the skill-related dictionary information 242 indicates that "basic motion 1" is a "Skill 1". In addition, for example the skill-related dictionary information 242 indicates that a combination of "basic motion 2+basic motion 1" (indicating that the "basic motion 2" and the "basic motion 1" are performed in sequence) is a "Skill 2". Furthermore, for example, the skill-related dictionary information 242 indicates that a combination of the "basic motion 1+basic motion 1+basic motion 3" is a "Skill 3".

Figure 8:
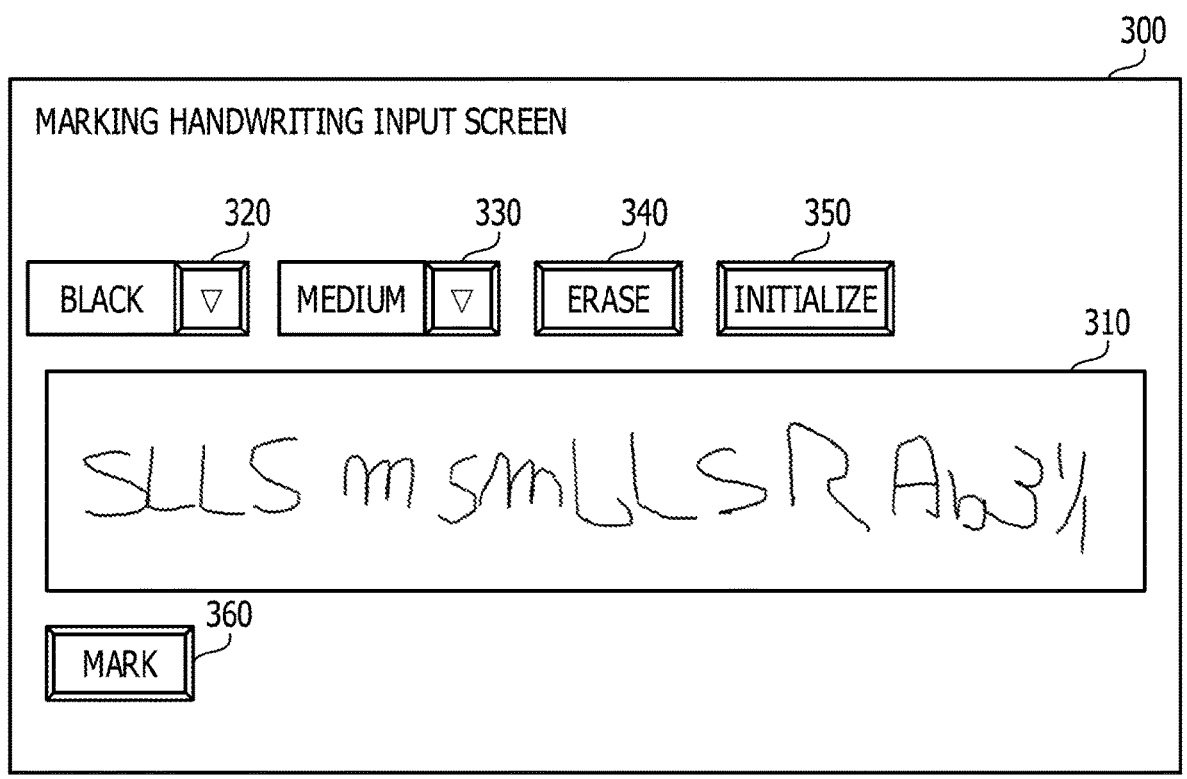
FIG. 8 is a diagram of an example of a marking handwriting input screen.

FIG. 8 is a diagram of an example of a marking handwriting input screen. The marking handwriting input screen 300 is generated by the GUI processing unit 130 and displayed by the display 105. The marking handwriting input screen 300 includes a handwriting input area 310, a color selection form 320, a size selection form 330, an erase button 340, an initialize button 350, and a mark button 360.

The handwriting input area 310 is an area for receiving the input of the characters handwritten by the referee R10. A direction from left to right of the handwriting input area 310 corresponds to a positive direction of the time sequence of the performance. The referee R10 may input the characters through the touch panel 107 using fingers or a stylus pen or the like. The handwriting input area 310 displays the inputted handwritten characters. The color selection form 320 is a selection form for receiving selection of a color of the characters displayed in the handwriting input area 310. The size selection form 330 is a selection form for receiving the selection of the size of the handwriting input area 310 (for example, selection candidates of several stages are prepared in advance and selectable by pulldown). The erase button 340 is a button for erasing the input of one character that is inputted at the last minute. The character input of which is erased is also erased from the handwriting input area 310. The initialize button 350 is a button for erasing all the characters inputted in the handwriting input area 310. The mark button 360 is a button for instructing the terminal device 100 to mark the performance based on content of the input in the handwriting input area 310.

Here, the skill name recognition unit 120 may identify a break of character strings in accordance with the spacing on the handwriting input area 310 of the characters inputted in the handwriting input area 310 or the time interval from end of the last input to start of the input this time. The break of the character strings corresponds to a break of two skills determined by the referee R10.

For example, if the spacing between the two characters on the handwriting input area 310 is larger than a predetermined value, the skill name recognition unit 120 judges that there is the break of the character strings between the two characters. In addition, if the spacing between the two characters on the handwriting input area 310 is smaller than or equal to the predetermined value, the skill name recognition unit 120 judges that there is no break of the character strings between the two characters.

Alternatively, for example, if the interval of time when the two characters are inputted is larger than the predetermined value, the skill name recognition unit 120 may judge that there is the break of the character strings between the two characters. In this case, if the interval of time when the two characters are inputted is smaller than or equal to the predetermined value, the skill name recognition unit 120 may judge that there is no break of the character strings between the two characters.

FIG. 9 is a diagram of an example of the skill name table. The skill name table 111 is stored in advance in the storage unit 110. The skill name table 111 includes entries of the skill name and stenographic characters. The skill name is registered in the skill name entry. The skill name is an example of the skill discriminator. In the stenographic character entry is registered handwriting information on the stenographic characters (including symbols) handwritten and inputted by the referee R10. The stenographic characters are the character strings (series of one or more characters) representative of the skill. The handwriting information is, for example, information that samples in advance the handwriting of the corresponding characters by the referee R10.

Note that one character inputted by the referee R10 corresponds to one basic motion. The stenographic characters are the character strings that combine one or more characters representative of the basic motions.

For example, in the skill name table 111, the handwriting information of the stenographic characters "SLL" is registered for a skill name "Skill W1". In the skill name table 111, the handwriting information of the stenographic characters are similarly registered for other skills.

The skill name recognition unit 120 may customize the skill name table 111 so that the skill name is appropriately recognized for the handwriting of the referee R10.

FIG. 10 is a diagram of an example of a skill management table. The skill management table 112 is stored in advance in the storage unit 110. The skill management table 112 includes the entries of the skill name, the group, and the difficulty. The skill name is registered in the entry of the skill name. The group corresponding to the skill name is registered in the entry of the group. The difficulty of the skill corresponding to the skill name is stored in the entry of difficulty.

For example, in the skill management table 112, information is registered that the skill name is the "Skill W1", the group is "I", and the difficulty is "A". This indicates that the group to which the skill having the skill name "Skill W1" belongs is "I", and that the difficulty of the skill having the skill name "Skill W1" is "A".

Here, the groups "I" to "V" are present in the pommel horse. Of these, the group "V" is the group of dismounts. The difficulty is expressed by "A" to "G". "A" represents the lowest difficulty. The difficulty ascends in alphabetical order. "G" represents the highest difficulty. However, in some events, there may be skills of the difficulty higher than the G-score.

In the skill management table 112, information on the group or the difficulty is similarly registered for other skill names.

FIG. 11 is a diagram of an example of the difficulty management table. The difficulty management table 113 is stored in advance in the storage unit 110. The difficulty management table 113 includes the entries of the difficulty and the value point. The difficulty is registered in the entry of the difficulty. The value point is registered in the entry of the value point.

For example, in the difficulty management table 113, the information is registered that the difficulty is "A" and the value point is "0.1". This indicates that the value point of the skill with the difficulty A is "0.1". In the difficulty management table 113 the value point is similarly registered for other degrees of difficulty.

FIG. 12 is a diagram of an example of a sensing result table. The sensing result table 114 is acquired by the GUI processing unit 130 from the server 200 and stored in the storage unit 110. The sensing result table 114 includes the entries of the skill name and the clock time. The skill name is registered in the entry of the skill name. The clock time when the skill represented by the skill name is started is registered in the entry of the clock time.

For example, in the sensing result table 114, information is registered that the skill name is the "Skill W1" and the clock time is "11:30:30,3". This indicates that the skill having the skill name "Skill W1" is recognized by the sensing technology of the server 200 for the performance of the player P10 and that the start clock time of the recognized skill is 11 o'clock 30 minutes 30.3 seconds. In the sensing result table 114, the skill names and start clock time are also associated and registered for other skills recognized by the server 200.

In addition, the GUI processing unit 130 acquires from the server 200 the clock time (skill end clock time) when the server 200 recognizes the skill ends, and associates the clock time with the skill name of the skill and records the clock time in the storage unit 110.

FIG. 13 is a diagram of an example of handwriting recognition result table. The handwriting recognition result table 115 is generated by the skill name recognition unit 120 and stored in the storage unit 110. The handwriting recognition result table 115 includes the entries of the skill name and the clock time. The skill name is registered in the entry of the skill name. The clock time when the input of the character strings corresponding to the skill name starts (input start clock time) is registered in the entry of the clock time.

For example, information is registered in the handwriting recognition table 115 that the skill name is "Skill W1" and the clock time is "11:30:30,5". This indicates that for the performance of the player P10, the skill having the skill name "Skill W1" is judged by the referee R10 and that the clock time when the input of the judged skill name starts is 11 o'clock 30 minutes 30.5 seconds. In the handwriting recognition result table 115, the skill name and the input start clock time are also associated and registered for other skills judged by the referee R10.

Note that if the skill name recognition unit 120 detects the break of the character string, the skill name recognition unit 120 identifies the clock time when the input of the character string which is inputted immediately before the break is complete (input completion clock time) and may also associate the input completion clock time with the corresponding skill name and record the input completion clock time.

FIG. 14 is a diagram of an example of a skill judgment result screen. The skill judgment result screen 400 is generated by the GUI processing unit 130 and displayed by the display 105. The skill judgment result screen 400 includes an automatic marking result area 410, a handwriting input result area 420, a cursor 430, and a count button 440.

The automatic marking result area 410 is an area where the skill recognition result and the marking result by the server 200 are displayed. The automatic marking result area 410 includes sections of a timeline, the skill name, the difficulty, the group, and a difficulty value point.

The timeline section displays the time slot during which each skill is recognized (performed) in the performance. The time slot is expressed by time from the performance start clock time to the skill start clock time (upper column in the timeline section) and time from the performance start clock time to the skill end clock time (lower column in the timeline section). However, the time displayed in the timeline section may be the skill start clock time or the skill end clock time detected by the server 200.

The skill name section displays the skill name of the skill recognized by the server 200. The difficulty section displays the difficulty of the skill. The group section displays the group of the skill. The difficulty value point section displays the value point according to the difficulty.

The handwriting input result area 420 is an area where the skill judgment result and the marking result by the referee R10 are displayed. The handwriting input result area 420 includes the sections of the timeline, the skill name, the difficulty, the group, and the difficulty value point, similarly to the automatic marking result area 410. However, the respective sections of the handwriting input result area 420 displays the skill name, the difficulty, the group, and the difficulty point value in accordance with the judgment result by the referee R10. In addition, the handwriting input result area 420 includes the skill section. The skill section displays the stenographic characters handwritten and inputted by the referee R10. The timeline section displays the time slot that is same as the automatic marking result area 410. However, the GUI processing unit 130 may also display the input start clock time or the input end clock time, which is handwritten and inputted by the referee R10, in the timeline section of the handwriting input result area 420.

In addition, the GUI processing unit 130 associates in sequence the respective skills registered in the sensing result table 114 and the respective skills registered in the handwriting recognition result table 115 with the time sequence and displays the respective skills. The GUI processing unit 130 arranges and displays a row of a certain slot time in the automatic marking result area 410 and a row of the same slot time in the handwriting input result area 420 in a vertical direction. In this manner, the GUI processing unit 130 may assist so as to facilitate the comparison by the referee R10.

The cursor 430 is a framework for highlighting a part where the skill judgment results (that is, marking results) differ in the automatic marking result area 410 and the handwriting input result area 420. In the example of FIG. 14, the marking results by the server 200 and the marking result by the referee R10 differ in the time slot "9:26 to 10:16" (9.26 seconds to 10.16 seconds from the performance start clock time). The GUI processing unit 130 highlights a part of this difference by the cursor 430 and presents the part to the referee R10. Note that a method of highlighting is not limited to the cursor 430 but may be any other method such as changing a background color from the background colors of other parts, displaying a symbol (such as an arrow symbol, for example) calling attention of the referee R10 so that the symbol points to the corresponding part.

The count button 440 is a button for instructing the terminal device 100 to mark the D score with the content displayed in the handwriting input result area 420.

By touching the part pointed by the cursor 430 with the finger or the stylus pen or the like, the referee R10 may input the skill name (skill recognition information) targeted for reviewing into the terminal device 100 with the function of the touch panel 107. When receiving the input of the skill name targeted for reviewing, the GUI processing unit 130 causes the display 105 to display the skill video playing screen.

FIG. 15 is a diagram of an example of the skill video playing screen. A skill video playing screen 500 is generated by the GUI processing unit 130 and displayed by the display 105. The skill video playing screen 500 includes a video playing area 510, a skill selection form 520, a difficulty selection form 530, a group selection form 540, and a decide button 550.

The video playing area 510 is an area for displaying the video (skill video) of the time slot corresponding to the skill name selected as a target for reviewing. In a periphery of the video playing area 510 may be displayed a play or stop button for receiving playing or stopping of the video, playing time of the video, an indicator for selecting a part of the video to be played, a switch button of sound on or off, an indicator for selecting volume, or the like. In addition, a button instructing slow playing or frame advance, or the like may also be displayed.

The skill selection form 520 is a form for receiving selection input of the skill name. The difficulty selection form 530 is a form for receiving the selection input of the difficulty. The group selection form 540 is a form for receiving the selection input of the group. However, in this example, since the difficulty or the group may be identified from the skill management table 112, the GUI processing unit 130 automatically inputs the difficulty in the difficulty selection form 530 or the group in the group selection form 540 for the skill name inputted in the skill selection form 520.

Here, the GUI processing unit 130 maintains the display of the skill judgment result screen 400 by the display 105 and causes the display 105 to display the skill video playing screen 500. Then, the referee R10 may review the corresponding skill while checking content of the display in the automatic marking result area 410 or the handwriting input result area 420.

The decide button 550 is a button for determining content inputted in the respective forms of the skill video playing screen 500 and reflecting the changed content in the corresponding parts of the handwriting input result area 420.

When an operation of pressing the decide button 550 is performed, the GUI processing unit 130 closes the skill video playing screen 500. Then, the GUI processing unit 130 reflects the changed content inputted on the skill video playing screen 500 in the corresponding part (part highlighted by the cursor 430) of the handwriting input result area 420. When receiving an operation of pressing the count button 440 by the referee R10, the GUI processing unit 130 asks the marking processing unit 150 to perform marking processing and causes the display 105 to display the marking result display screen including the results of the marking processing.

FIG. 16 is a diagram of an example of the marking result display screen. The marking result display screen 600 is generated by the GUI processing unit 130 and displayed by the display 105. The marking result display screen 600 is a screen for displaying the marking processing by the marking processing unit 150 based on the content of the handwriting input result area 420 in the skill judgment result screen 400.

For example, the marking result display screen 600 includes a section for displaying the stenographic characters handwritten and inputted by the referee R10, a section for displaying the difficulty of the skill judged for each of the stenographic characters, and a section for displaying the group of the same skill.

In addition, a counting result of the value points according to the difficulty of the judged skill is displayed in the marking result display screen 600. Note that in the pommel horse, of the plurality of skills performed, the value points of the dismount and 9 skills of high difficulty other than the dismount (total of 10 skills) are counted. In the example of the marking result display screen 600, although a total of 12 skills is performed, the value points of the two skills with the A difficulty are not evaluated.

In the example of the marking result display screen 600, there are the two skills with the E difficulty. Thus, the counting result of the value points of the skills of the E difficulty is 2*0.5=1.0. There are the four skills of the D difficulty. Thus, the counting result of the value points of the skills of the D difficulty is 4*0.4=1.6. There are the four skills of the B difficulty. Thus, the counting result of the value points of the skills of the B difficulty is 4*0.2=0.8. Results (Total elements) that further count these counting results of the value points by the difficulty is "3.4". In addition, since all of the skills in four groups "I" to "IV" is performed, the request group point (Element group) is 0.5*4=2.0. Furthermore, the dismounts (group "V") are of the E difficulty, the scores (Dismount) of the dismounts is "0.5" (the score to be added to the dismount is predetermined depending on the difficulty). In the pommel horse, there is no the combination point addition (Connections), and thus the corresponding section is blank. Therefore, the D score (D Score) is 3.4+2.0+0.5=5.9.

Note that the marking result display screen 600 may include display sections of a name (Name) of the player P10 or points deducted (P: Penalty) such as a line deduction point or time deduction point, the marking results of E score (E score), and a determined point (Final Score), or the like.

In the following, description is given of processing procedure by the marking assist system of the second embodiment.

Figure 17:
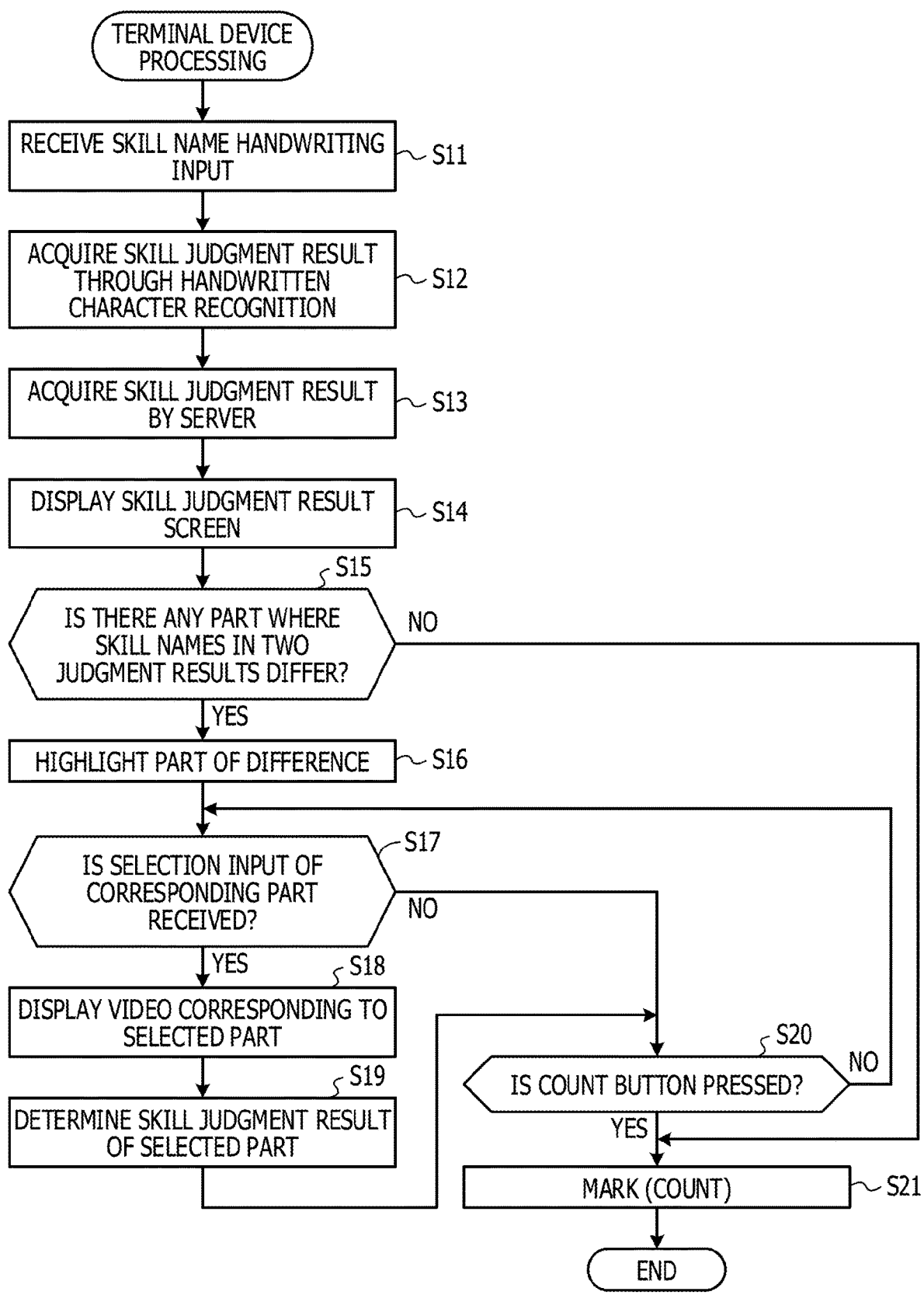
FIG. 17 is a flow chart of a processing example of the terminal device.

FIG. 17 is a flow chart of a processing example of the terminal device. The processing illustrated in FIG. 17 is hereinafter described along step numbers.

(S11) The GUI processing unit 130 causes the display 105 to display the marking handwriting input screen 300 and receives the handwriting input by the referee R10 of the character strings representing the skill, when the performance by the player P10 starts. During the performance, the referee R10 enters in line the character strings representing the skill names judged by himself or herself in the handwriting input area 310 of the marking handwriting input screen 300, from left to right of the handwriting input area 310. Then, the referee R10 gives the break of the skills a space longer than a predetermined length. The GUI processing unit 130 also records the input start clock time of the character strings representing the respective skills or the input end clock time of the character strings representing the respective skills in the storage unit 110. When the performance by the player P10 is complete and the handwriting input by the referee R10 is complete, the GUI processing unit 130 receives an operation of pressing the mark button 360 by the referee R10.

(S12) The GUI processing unit 130 acquires the skill judgment result by a handwritten character recognition capability. Specifically, the handwritten character recognition capability is provided by the skill name recognition unit 120. The skill name recognition unit 120 identifies the break of the skills based on the space between characters or the input time interval. The skill name recognition unit 120 identifies the skill name by matching handwriting information of the character strings inputted in the handwriting input area 310 against the handwriting information of the stenographic characters in the skill name table 111 stored in the storage unit 110. The skill name recognition unit 120 associates the identified skill name with the input start clock time of the character string representing the skill name and records the skill name in the handwriting recognition result table 115 stored in the storage unit 110. As described earlier, the skill name recognition unit 120 may associate the input end clock time of the corresponding character string with the identified skill, in addition to the input start clock time, and record the input end clock time in the handwriting recognition result table 115.

(S13) The GUI processing unit 130 acquires the skill judgment result by the server 200. The GUI processing unit 130 registers the skill judgment result by the server 200 in the sensing result table 114 stored in the storage unit 110. The skill judgment result of the server 200 includes the information on the start clock time or the end clock time detected by the server 200 for the skill corresponding to the skill name, in addition to the judgment result of the skill name. As described earlier, the GUI processing unit 130 may also associate the skill end clock time with the judged skill name and register the skill end clock time in the sensing result table 114, in addition to the skill start clock time. The GUI processing unit 130 also acquires the information on the performance start clock time of the corresponding performance from the server 200.

(S14) the GUI processing unit 130 causes the display 105 to display the skill judgment result screen 400, based on the skill management table 112, the difficulty management table 113, the sensing result table 114, and the handwriting recognition result table 115 stored in the storage unit 110. Then, the GUI processing unit 130 associates in sequence the skill names registered in the sensing result table 114 and the skill names registered in the handwriting recognition result table 115 with the time sequence. The GUI processing unit 130 displays the time slots detected by the server 200 (time elapsed from the performance start clock time) in which the respective skills are performed, in the section of the timeline of the automatic marking result area 410 and the handwriting input result area 420 on the skill judgment result screen 400.

(S15) The GUI processing unit 130 judges whether or not there are any parts having the different skill names in the same timeline in both of the judgment results (display content of the automatic marking result area 410 and display content of the handwriting input result area 420) in the display content of the skill judgment result screen 400. If so, the GUI processing unit 130 shifts the processing to step S16. If not, the GUI processing unit 130 shifts the processing to step S21.

(S16) The GUI processing unit 130 highlights parts for which the skill names judged in step S15 are different (corresponding parts in the handwriting input result area 420) (highlighted display). Specifically, it is possible that the GUI processing unit 130 display the cursor 430 pointing the corresponding part or display the background or characters of the corresponding part in a different color than other parts, or the like.

(S17) The GUI processing unit 130 judges whether or not the selection input of the highlighted corresponding part is received. If so, the GUI processing unit 130 shifts the processing to step S18. If not, the GUI processing unit 130 shifts the processing to step S20.

(S18) The GUI processing unit 130 causes the display 105 to display the skill video playing screen 500, thus displaying the video corresponding to the selected part in the video playing area 510. Specifically, the GUI processing unit 130 acquires the time slot of the timeline corresponding to the skill name (that is, the skill name targeted for reviewing) displayed in the selected part of the skill judgment result screen 400 and notifies the skill video playing unit 140. The skill video playing unit 140 downloads ad displays a portion of the corresponding time slot (skill video) of the video of the corresponding performance recorded by the server 200. The GUI processing unit 130 displays the skill video played by the skill video playing unit 140 in the video playing area 510.

(S19) The GUI processing unit 130 determines the skill judgment result of the selected part in the skill judgment result screen 400. Specifically, the GUI processing unit 130 receives the selection input of the skill name by the referee R10, using the skill selection form 520 on the skill video playing screen 500. The GUI processing unit 130 displays the difficulty for the selected skill name in the difficulty selection form 530. The GUI processing unit 130 displays the group for the selected skill name in the group selection form 540. When receiving input of an operation of pressing the decide button 550 of the referee R10, the GUI processing unit 130 closes the skill video playing screen 500 and determines the skill judgment result of the selected part in the skill judgment result screen 400 as the selected skill name. The GUI processing unit 130 displays the skill name determined for the selected part in the skill judgment result screen 400 (corresponding part in the handwriting input result area 420), the difficulty for the skill name, the group, and the value points.

(S20) The GUI processing unit 130 judges whether or not the count button 440 of the skill judgment result screen 400 is pressed. If the count button 440 is pressed, the GUI processing unit 130 shifts the processing to step S21. If the count button 440 is not pressed, the GUI processing unit 130 shifts the processing to step S17.

(S21) The GUI processing unit 130 asks the marking processing unit 150 to perform marking based on the skill judgment result displayed in the handwriting input result area 420 on the skill judgment result screen 400, and causes the display 105 to display the marking result display screen 600 including the marking results by the marking processing unit 150. Specifically, the marking processing unit 150 calculates the D score by counting the value points of the skills, the request group points, and the dismount, according to the marking rules and provides the calculation results of the D score to the GUI processing unit 130. The GUI processing unit 130 causes the display 105 to display the marking result display screen 600 based on the calculation results acquired from the marking processing unit 150.

Here, the terminal device 100a also performs the similar procedure to the terminal device 100.

In the following, description is given of the processing procedure by the server 200.

Figure 18:
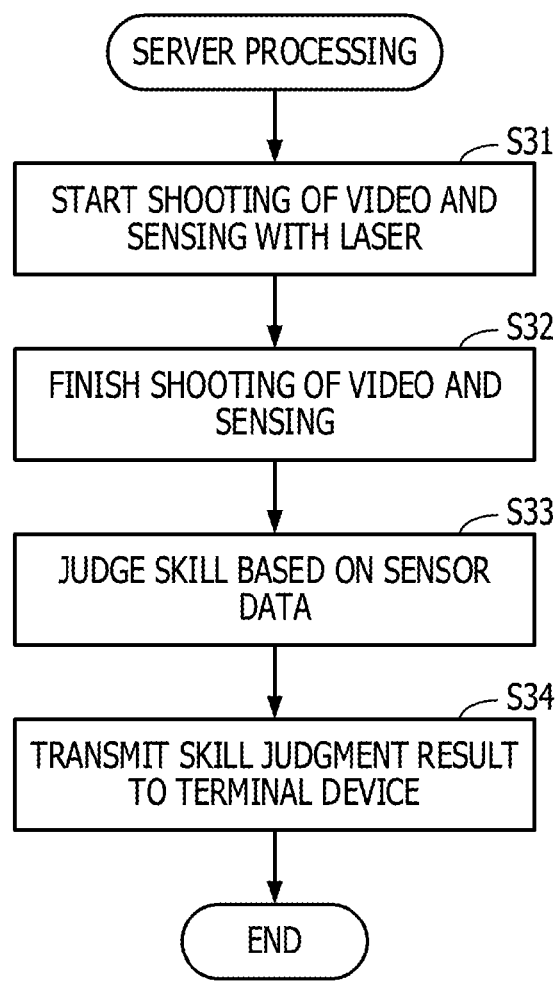
FIG. 18 is a flow chart of the processing example of the server.

FIG. 18 is a flow chart of the processing example of the server. The processing illustrated in FIG. 18 is hereinafter described along step numbers.

(S31) The video saving unit 220 starts shooting a video of the player with the video shooting camera 21 as the player P10 starts the performance, and saves the shot video in the video storage unit 210. In addition, the sensor data reception unit 260 starts laser sensing with the laser sensors 22 and 22a as the player P10 starts the performance, and saves acquired sensor data in the sensor data storage unit 250. The video or the sensor data includes the information on the performance start clock time. Note that the clock time recorded with respect to the video and the clock time recorded with respect to the sensor data are synchronized between the video saving unit 220 and the sensor data reception unit 260.

(S32) The video saving unit 220 finishes shooting of the video of the performance with the video shooting camera 21 as the player P10 finishes the performance. The sensor data reception unit 260 finishes the laser sensing with the laser sensors 22 and 22a as the player P10 finishes the performance.

(S33) The skeleton recognition unit 270 and the skill recognition unit 280 judge the skills based on the sensor data. Specifically, the skeleton recognition unit 270 detects the time sequence change of the three-dimensional skeleton data D11 based on the sensor data stored in the sensor data storage unit 250. The skill recognition unit 280 matches the time sequence change of the skeleton data D11 against the motion patterns of the basic motions of the basic motion dictionary information 241 stored in the dictionary information storage unit 240 and identifies the basic motion and the combination of the basic motions. The skill recognition unit 280 refers to the skill-related dictionary information 242 stored in the dictionary information storage unit 240 and identifies the skill name of the skill in accordance with the combination of the basic motions. The skill recognition unit 280 detects the start clock time and the end clock time of the identified skill.

(S34) The skill recognition unit 280 transmits the skill judgment result to the terminal device 100. For example, the skill recognition unit 280 transmits the skill judgment result to the terminal device 100 in response to a request for acquisition of the skill judgment result transmitted by the terminal device 100. The skill judgment result includes the skill name of the identified skill, and the start clock time, and the end clock time of the skill.

Note that after the step S34, when requested by the terminal devices 100 and 100a for portions of predetermined time slots of the recorded performance video, the video delivery unit 230 delivers the requested portions of the time slots of the corresponding video to the terminal devices 100 and 100a.

However, the skill video playing unit 140 may download the performance video saved in the server 200 after the performance ends, extract the skill video of the time slot specified by the referee R10 from the downloaded video, and cause the display 105 to display the skill video.

Note that the D score is determined by the referees R10 and R20 working as a team of two referees, as described earlier. The referee R20 also marks the performances, similarly to the referee R10. Then, if there is a difference between the D scores judged by the referees R10 and R20, the referees R10 and R20 determines the final D score through discussions. Furthermore, the E score or the like is also considered, and the final score for the performance is determined.

In this manner, when the referee R10 compares the own marking result with the marking results by the server 200 to determine the D score, the terminal device 100 associates and displays the discriminator included in both of the marking results, and identifies and displays skill video associated with the selected discriminator. This allows the terminal device 100 to promptly present to the referee R10 the information used in comparison of the marking results (information included in the skill judgment result screen 400 or the skill video playing screen 500).

With the skill judgment result screen 400, the referee R10 may easily identify the skill the judgments of which differ in both of the marking results. With the skill video playing screen 500, the referee R10 may also quickly check the video of the parts on which the skill judgment results differ and make a correction to the judgments. This may make the marking by the referee R10 efficient. Moreover, the reliability of the marking may be improved efficiently.

Here, although in step S11 of FIG. 17, the GUI processing unit 130 assists the handwriting input with the marking handwriting input screen 300, the handwriting input may be assisted with any GUI other than the marking handwriting input screen 300.

Figure 19:
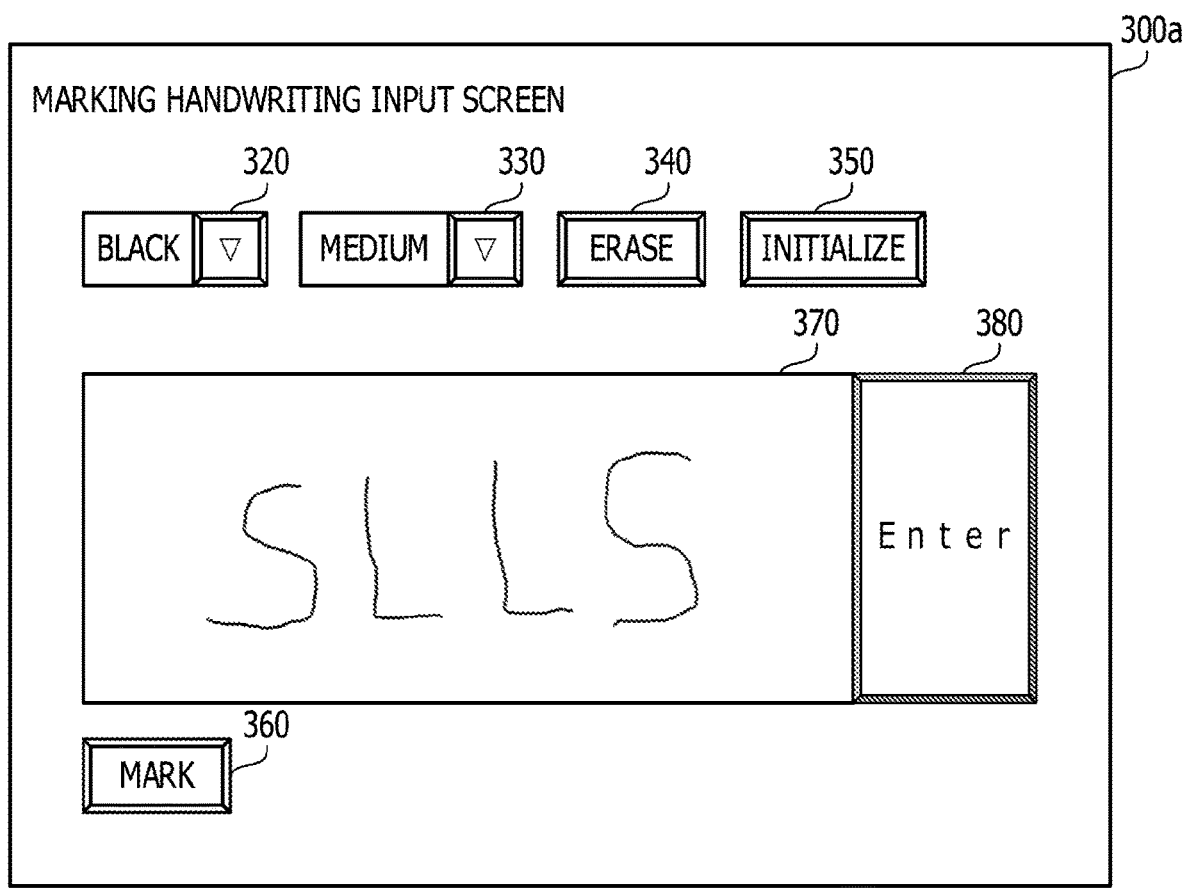
FIG. 19 is a diagram of other examples of the marking handwriting input screen.

FIG. 19 is a diagram of other example of the marking handwriting input screen. The marking handwriting input screen 300a is generated by the GUI processing unit 130 and displayed by the display 105. The marking handwriting input screen 300a includes the color selection form 320, the size selection form 330, the erase button 340, the initialize button 350, the mark button 360, a handwriting input area 370, and an Enter button 380.

Here, roles of the color selection form 320, the size selection form 330, the erase button 340, the initialize button 350, and the mark button 360 are similar to the screen elements with the same names in the marking handwriting input screen 300.

The handwriting input area 370 is an area for receiving the input of the handwritten characters by the referee R10. The direction from the left side to the right side of the handwriting input area 370 corresponds to the positive direction of the time sequence of the skill. The referee R10 may input characters through the touch panel 107 using the finger or the stylus pen, or the like. The inputted stenographic characters are displayed in the handwriting input area 370.

The Enter button 380 is a button to be pressed and operated by the referee R10 when the handwriting input for every skill is complete. When receiving the operation of pressing the Enter button 380, the GUI processing unit 130 acquires the handwriting information of the stenographic characters stated in the handwriting input area 370 and identifies the skill name by the skill name table 111. The GUI processing unit 130 registers the identified skill name in the handwriting recognition result table 115. The GUI processing unit 130 also clears the display in the handwriting input area 370 and waits for handwriting input of a next skill.

When the performance is complete, the GUI processing unit 130 receives the operation of pressing the mark button 360 by the referee R10. When receiving the operation of pressing the mark button 360, the GUI processing unit 130 shifts to the display of the skill judgment result screen 400.

In this manner, the GUI processing unit 130 may also determine the handwritten and inputted stenographic characters for every skill.

Furthermore, the GUI processing unit 130 may cause the display 105 to simultaneously display both of the marking handwriting input screen 300a and the skill judgment result screen 400, quickly analyze the skill name from the stenographic characters determined for every skill, and reflect the skill name in the skill judgment result screen 400.

FIG. 20 is a diagram of other example of the skill judgment result screen. Although in the procedure illustratively illustrated in FIGS. 17 and 18, the GUI processing unit 130 displays the skill judgment result screen 400 after the performance is complete, the GUI processing unit 130 may display the skill judgment result screen 400 even during the performance and quickly update the display content of the skill judgment result screen 400 depending on the input during the performance. The example of FIG. 20 illustratively illustrates a state in which a third skill "E flops" judged by the server 200 and the third skill "E flops" judged by the referee R10 are reflected in the skill judgment result screen 400.

Note that in the above description, a case is illustratively illustrated in which the skill judgment result by the referee R10 and the skill judgment result by the server 200 are compared. In addition to this, the function of the terminal device 100 may also be used in comparison of the skill judgment result by the referee R10 and the skill judgment result by the referee R20, for example.

Figure 21:
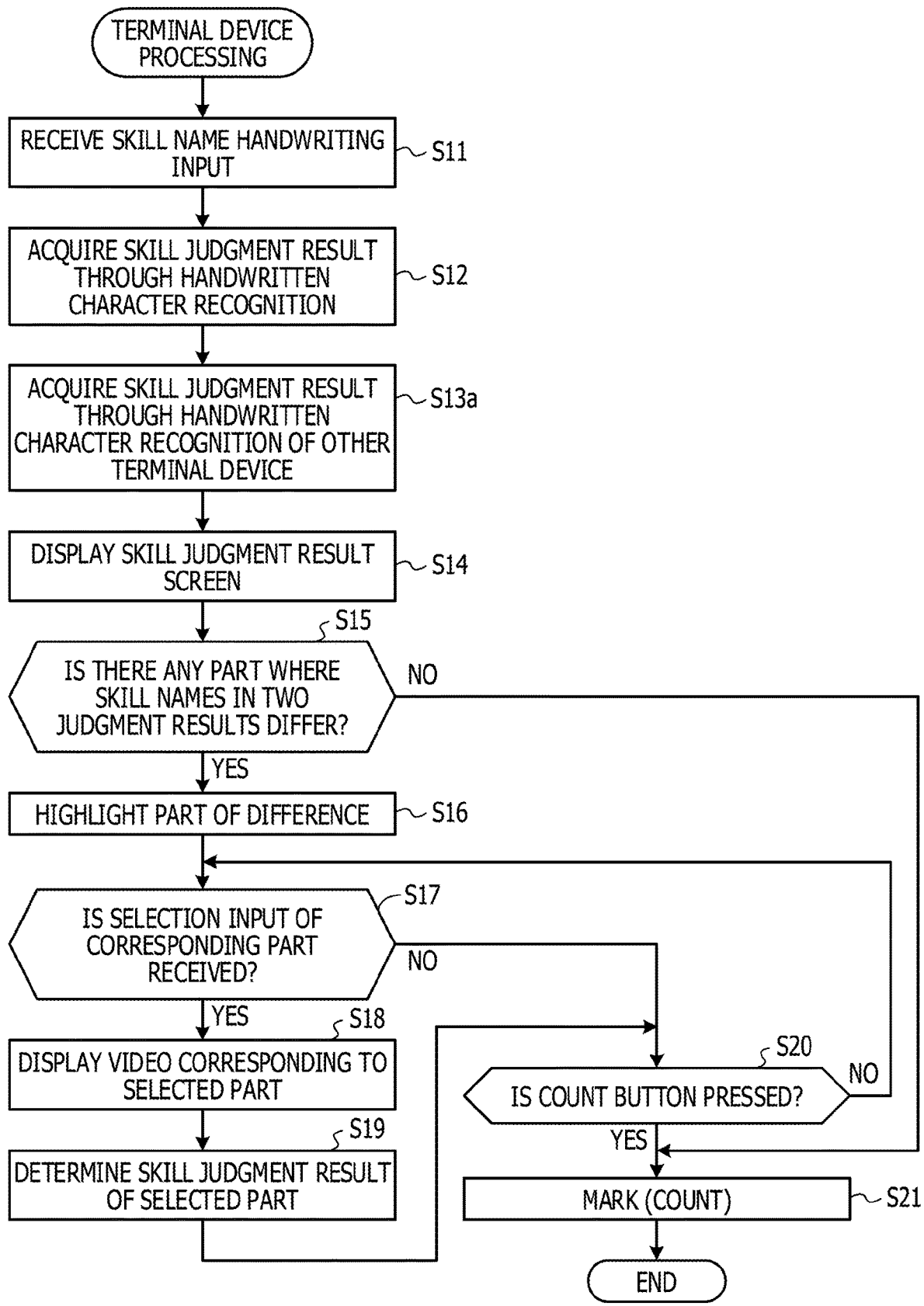
FIG. 21 is a flow chart of other processing examples of the terminal device.

FIG. 21 is a flow chart of other processing example of the terminal device. The processing illustrated in FIG. 21 is hereinafter described along step numbers. Here, the procedure of FIG. 21 differs from the procedure of FIG. 17 in that the GUI processing unit 130 performs a step S13a, instead of the step S13 of FIG. 17. Then, in the following, description of the step S13a is given and description of other steps is omitted.

(S13a) The GUI processing unit 130 acquires the skill judgment result by the handwritten character recognition of other terminal device (terminal device 100a). The skill judgment result of the terminal device 100a may be the skill judgment result after correction by the referee R20 using the procedure illustratively illustrated in FIG. 17. The GUI processing unit 130 saves the skill judgment result acquired from the terminal device 100a in the storage unit 110. The skill judgment result acquired from the terminal device 100a also includes the judged skill name, the skill starting clock time, and the skill end clock time.

The GUI processing unit 130 performs the processing after step S14 on the skill judgment result by the terminal device 100 and the skill judgment result by the terminal device 100a. This allows the terminal device 100 to assist efficient comparison of the skill judgment results by the referees R10 and R20.

For example, it is also possible that use of the procedure after the step S13a allows for a further comparison of the skill judgment result after the referee R10 makes a correction in light of the skill judgment result by the server 200 and the skill judgment result after the referee R20 makes a correction in light of the skill judgment result by the server 200.

In this manner, the terminal device 100 may assist so that the referees R10 and R20 may quickly determine the D score.

Note that the information processing of the first embodiment may be implemented by causing the processing unit 1b to execute the program. In addition, the information processing of the second embodiment may be implemented by causing the processor 101 to execute the program. The programs may be stored in a computer readable recording medium 12.

For example, distribution of the recording medium 12 having the programs stored allows the programs to be distributed. In addition, the programs may be stored in other computers and may be distributed by way of the network. For example, the program stored in the recording medium 12 and a program received from other computers may be stored (installed) in a storage device such as the RAM 102 or the HDD 103, and the programs may be read from the storage device and executed.

The foregoing merely represents the principle of the present disclosure. Furthermore, many variations or modifications are possible to those in the art. The present disclosure is not limited to the exact configurations and applications illustrated and described above, and all corresponding modifications and equivalents are deemed within the appended claims and its equivalents.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A marking assist device comprising:
a memory; and
a processor coupled to the memory, the processor being configured to:
acquire, for a respective time period corresponding to each of a plurality of skills performed by a player in a time sequence, a first marking result and a second marking result, the first marking result including a marking result of a respective skill based on sensor data on the player obtained during the performing of the respective skill, the first marking result further including a first discriminator of the respective skill identified based on the sensor data, the second marking result including a marking result inputted by a person other than the player with respect to the respective skill, the second marking result further including a second discriminator of the respective skill identified and inputted by the person;
display, for the respective time period corresponding to each of the plurality of skills, the first marking result and the second marking result in association with the respective time period, the displaying of the first marking result including displaying the first discriminator included in the first marking result in association with the respective time period, the displaying of the second marking result including displaying the second discriminator included in the second marking result in association with the respective time period, wherein the displaying of the first discriminator and the displaying of the second discriminator are performed simultaneously so as to help for a referee to compare for the respective time period the first discriminator with the second discriminator; and
in response to an input indicating that any discriminator is selected by the referee from the displayed discriminators, acquire and display a video associated with a time period corresponding to the selected discriminator, the video including a plurality of images obtained by capturing the player during the time period corresponding to the selected discriminator.

2. The marking assist device according to claim 1, wherein
the first marking result includes information on a time slot during which the player performs an action based on which the corresponding first discriminator is determined, and
in the identification of the video, the video recorded in the time slot corresponding to the selected discriminator is identified from the images.

3. The marking assist device according to claim 1, wherein
the first discriminator and the second discriminator are associated based on first time when the player performs the action based on which the corresponding first discriminator is determined and second time when the referee performs input corresponding to the second discriminator.

4. The marking assist device according to claim 1, wherein
the second discriminator is highlighted if the second discriminator associated with the first discriminator is different from the first discriminator.

5. The marking assist device according to claim 1, wherein
in the display of the video, a correction to the discriminator corresponding to the skill included in the video is received.

6. The marking assist device according to claim 1, wherein
in the acquisition of the second marking result, handwriting input of a character string by the referee is received and the second discriminator corresponding to the character string is acquired.

7. A marking assist method to be executed by a processor, the marking assist method comprising:
acquiring, for a respective time period corresponding to each of a plurality of skills performed by a player in a time sequence, a first marking result and a second marking result, the first marking result including a marking result of a respective skill based on sensor data on the player obtained during the performing of the respective skill, the first marking result further including a first discriminator of the respective skill identified based on the sensor data, the second marking result including a marking result inputted by a person other than the player with respect to the respective skill, the second marking result further including a second discriminator of the respective skill identified and inputted by the person;
displaying, for the respective time period corresponding to each of the plurality of skills, the first marking result and the second marking result in association with the respective time period, the displaying of the first marking result including displaying the first discriminator included in the first marking result in association with the respective time period, the displaying of the second marking result including displaying the second discriminator included in the second marking result in association with the respective time period, wherein the displaying of the first discriminator and the displaying of the second discriminator are performed simultaneously so as to help for a referee to compare for the respective time period the first discriminator with the second discriminator; and
in response to an input indicating that any discriminator is selected by the referee from the displayed discriminators, acquiring and displaying a video associated with a time period corresponding to the selected discriminator, the video including a plurality of images obtained by capturing the player during the time period corresponding to the selected discriminator.

8. The marking assist method according to claim 7, wherein
the first marking result includes information on a time slot during which the player performs an action based on which the corresponding first discriminator is determined, and
in the identification of the video, the video recorded in the time slot corresponding to the selected discriminator is identified from the images.

9. The marking assist method according to claim 7, wherein
the first discriminator and the second discriminator are associated based on first time when the player performs the action based on which the corresponding first discriminator is determined and second time when the referee performs input corresponding to the second discriminator.

10. The marking assist method according to claim 7, wherein
the second discriminator is highlighted if the second discriminator associated with the first discriminator is different from the first discriminator.

11. The marking assist method according to claim 7, wherein
in the display of the video, a correction to the discriminator corresponding to the skill included in the video is received.

12. The marking assist method according to claim 7, wherein
in the acquisition of the second marking result, handwriting input of a character string by the referee is received and the second discriminator corresponding to the character string is acquired.

13. A non-transitory computer-readable storage medium storing a marking assist program that causes a computer to execute a process, the process comprising:
acquiring, for a respective time period corresponding to each of a plurality of skills performed by a player in a time sequence, a first marking result and a second marking result, the first marking result including a marking result of a respective skill based on sensor data on the player obtained during the performing of the respective skill, the first marking result further including a first discriminator of the respective skill identified based on the sensor data, the second marking result including a marking result inputted by a person other than the player with respect to the respective skill, the second marking result further including a second discriminator of the respective skill identified and inputted by the person;
displaying, for the respective time period corresponding to each of the plurality of skills, the first marking result and the second marking result in association with the respective time period, the displaying of the first marking result including displaying the first discriminator included in the first marking result in association with the respective time period, the displaying of the second marking result including displaying the second discriminator included in the second marking result in association with the respective time period, wherein the displaying of the first discriminator and the displaying of the second discriminator are performed simultaneously so as to help for a referee to compare for the respective time period the first discriminator with the second discriminator; and
in response to an input indicating that any discriminator is selected by the referee from the displayed discriminators, acquiring and displaying a video associated with a time period corresponding to the selected discriminator, the video including a plurality of images obtained by capturing the player during the time period corresponding to the selected discriminator.

14. The non-transitory computer-readable storage medium according to claim 13, wherein
the first marking result includes information on a time slot during which the player performs an action based on which the corresponding first discriminator is determined, and
in the identification of the video, the video recorded in the time slot corresponding to the selected discriminator is identified from the images.

15. The non-transitory computer-readable storage medium according to claim 13, wherein
the first discriminator and the second discriminator are associated based on first time when the player performs the action based on which the corresponding first discriminator is determined and second time when the referee performs input corresponding to the second discriminator.

16. The non-transitory computer-readable storage medium according to claim 13, wherein
the second discriminator is highlighted if the second discriminator associated with the first discriminator is different from the first discriminator.

17. The non-transitory computer-readable storage medium according to claim 13, wherein
in the display of the video, a correction to the discriminator corresponding to the skill included in the video is received.

18. The non-transitory computer-readable storage medium according to claim 13, wherein
in the acquisition of the second marking result, handwriting input of a character string by the referee is received and the second discriminator corresponding to the character string is acquired.

* * * * *